United States Patent
Goshey et al.

(10) Patent No.: US 6,205,527 B1
(45) Date of Patent: Mar. 20, 2001

(54) INTELLIGENT BACKUP AND RESTORING SYSTEM AND METHOD FOR IMPLEMENTING THE SAME

(75) Inventors: Michael M. Goshey; Guido Maffezzoni; Gilbert Chang-Tying Wu, all of San Jose; Yen-Chung Lin, Saratoga; John D. Nguyen, Milpitas, all of CA (US); Roger A. Stoller, Harwood Heights, IL (US); Kristine N. Luong, Santa Clara; Robert S. Hudson, San Jose, both of CA (US); David A. Coleman, Silverdale; Dennis M. Sumners, Port Orchard, both of WA (US); Thanh T. Bui, San Jose, CA (US); Tony Fu, Placentia, CA (US); Tony G. Kwan, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/110,783

(22) Filed: Jul. 6, 1998

Related U.S. Application Data

(60) Provisional application No. 60/075,687, filed on Feb. 24, 1998.

(51) Int. Cl.[7] ................................................. G06F 12/00
(52) U.S. Cl. .............................. 711/162; 717/11; 714/6
(58) Field of Search .................................. 711/162, 161; 717/11; 709/213; 713/2

(56) References Cited

U.S. PATENT DOCUMENTS 5,269,022 * 12/1993 Shinjo et al. ........................... 713/2
5,469,573 * 11/1995 McGill, III et al. ................... 717/11
5,694,600 * 12/1997 Khenson et al. ........................ 713/2
5,713,024 * 1/1998 Halladay ............................... 717/11
5,754,782 * 5/1998 Masada ............................... 709/213

OTHER PUBLICATIONS

Unknown, "*XactCopy*", DuoCor, Inc., Nevada City, CA.

* cited by examiner

*Primary Examiner*—Do Yoo
*Assistant Examiner*—Nasser Moazzami
(74) *Attorney, Agent, or Firm*—Martine Penilla & Kim, LLP

(57) ABSTRACT

Disclosed is an apparatus, a system, a computer readable media, and a method for protecting data of a computer system. The method includes: (a) connecting a peripheral storage device to the computer system; (b) preparing a storage media of the peripheral storage device to be a protection enabled media; (c) selecting a backup set of data stored in a hard drive of the computer system, the backup set of data includes a default set of boot files and operating system files; (d) creating a spare tire backup using file-based copying from the hard drive of the computer system to the storage media of the peripheral storage device; (e) enabling the peripheral storage device to incrementally copy portions of the backup set of data from the hard drive of the computer system during normal use; and (f) booting the computer system from the peripheral storage device when a failure occurs with the hard drive that disables normal booting. In this manner, the user can resume uninterrupted work from the spare tire backup of the peripheral storage device until the hard drive failure is repaired.

35 Claims, 21 Drawing Sheets

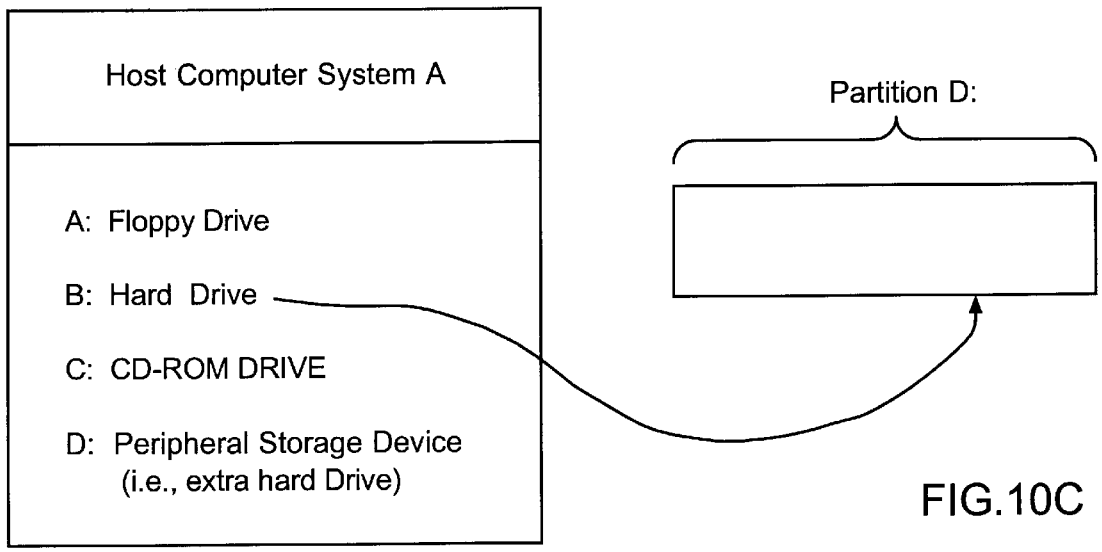
FIG.10B
FIG.10C
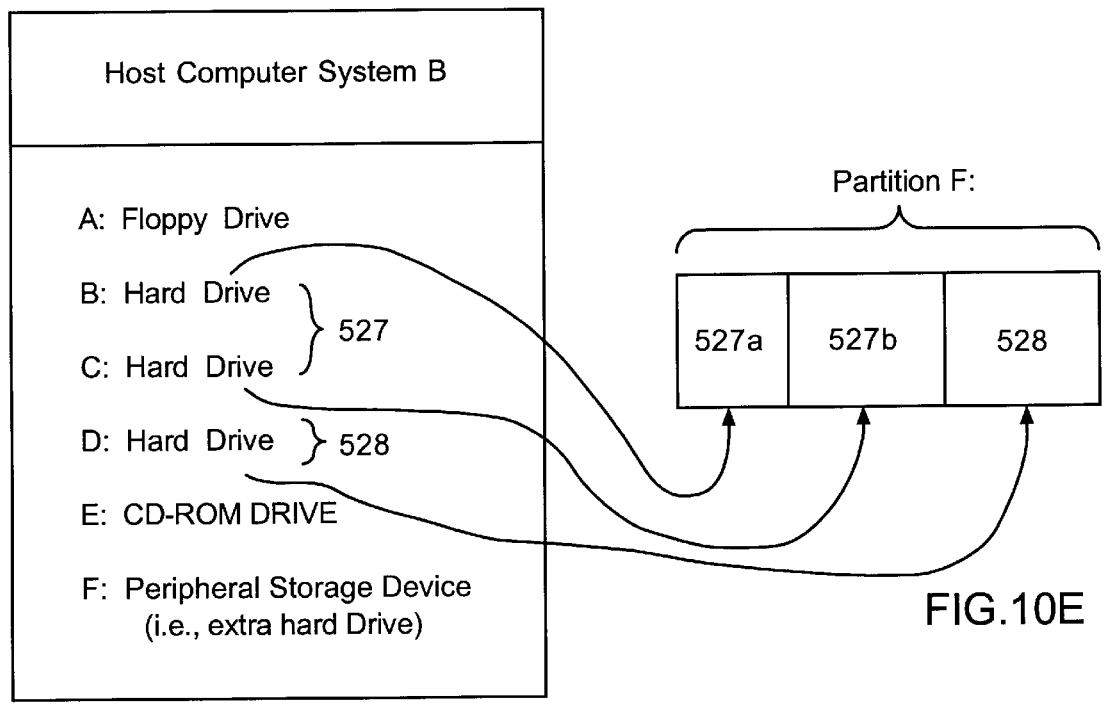
FIG.10D
FIG.10E

INTELLIGENT BACKUP AND RESTORING SYSTEM AND METHOD FOR IMPLEMENTING THE SAME

CROSS REFERENCE To RELATED APPLICATIONS

This application claims the benefit of U.S. Provisional Patent Application having U.S. Ser. No. 60/075,687, filed on Feb. 24, 1998, entitled "METHOD AND APPARATUS FOR DATA BACKUP ANA DATA RESTORING AFTER STORAGE DRIVE FAILURES," which is hereby incorporated by reference.

BACKGROUND OF THE INVENTION

1. Field of the Invention

This invention relates generally to intelligent backup systems, and more particularly to methods and apparatus for intelligently backing up selected data from a host computer's main storage drive to prevent loss of data or user productivity.

2. Description of the Related Art

In recent years, personal computers have become an integral necessity in both the work and home environment. For many people, personal computers have become their main communication system, which can be used for sending and receiving electronic mail (i.e., e-mail), transferring files over a local area network (LAN), and communicating over the world wide web via the Internet. Because people have placed such a high level of dependence on their personal computers, when a failure (i.e., crash) to either a hardware or software component occurs, the user will generally suffer greatly in terms of productivity loss.

Many times, failures to either hardware or software components can lead to the complete loss of personal data, which many times cannot be recovered using standard data recovery tools. In efforts to remedy the severity of such data loss, many people perform routine backups of there entire hard drives or files. In this manner, if an unrecoverable failure were to occur, the user would only lose the data that was created between the last backup operation and the unrecoverable failure.

Unfortunately, relying on periodic backups of a computer's storage drives (i.e., hard drives) does not eliminate the loss in productivity suffered while the failure is being attended to, and the need to reconstruct all of the lost data that was created between the last backup and the failure. To further complicate the reconstruction process, most of today's computer software products have to be installed using complex installation software that is designed to place each component of the software product in the correct system folder location, registry file, startup files, etc., in order to preserve proper functionality with the computer's operating system. As a result, even though the entire contents of a backup can be retrieved from the backup media, the restoring of a subsequently repaired storage drive will require a substantial amount of reconstruction.

Although the restoration of failed storage devices can sometimes be a trivial process when only a minor number of programs are re-installed onto the failed computer system, most of today's computer systems use a wide number of programs, each requiring custom installation for proper operation. Furthermore, because most computer users purchase, update and modify computer programs over the Internet, it is often impossible to reconstruct the original state of all programs, patches or executables that are loaded onto a computer without keeping detailed logs of where each component was acquired. As a result, when attempts to reconstruct a user's computer system are attempted, many of the originally installed software programs or components may not be installed because they are no longer available or supported by the original supplier.

In spite of the fact that most failures that are a result of a hardware malfunction or a software problem can be fixed, either by complete replacement or by performing repairs, users still experience data losses that produce harsh penalties in productivity or require significant down time. That is, even if users systematically backs up their system regularly, some amount of data will be lost between the time of the last back up and the subsequent restoration. In certain circumstances, even if only a small amount of data is lost, that small amount may translate into many hours of reconstruction time. Furthermore, if the lost data was a time sensitive piece of data, reconstruction over many hours or days may not be acceptable.

In view of the foregoing, there is a need for an intelligent backup system and method for implementing the system to protect data of a computer's storage drive in case a system failure occurs. There is also a need for a system and a method for implementing the system that will enable a user to continue working from the intelligently backed-up data after a system failure occurs, and then restore the failed system after the system failure is intelligently identified and repaired.

SUMMARY OF THE INVENTION

Broadly speaking, the present invention fills these needs by providing an intelligent backup and restore system that prevents downtime productivity losses, and assists the user in trouble shooting the failure, repairing the failure if possible, and restoring the failed system back to its pre-failure condition. All of these functionalities are provided to the user through a user friendly graphical user interface that helps the user resume his or her normal computer use by booting to a peripheral storage device (that holds an intelligently backup data set) while the failure is remedied. It should be appreciated that the present invention can be implemented in numerous ways, including as a process, an apparatus, a system, a device, a method, or a computer readable medium. Several inventive embodiments of the present invention are described below.

In one embodiment, a method for protecting data of a computer system is disclosed. The method includes: (a) connecting a peripheral storage device to the computer system; (b) preparing a storage media of the peripheral storage device to be a protection enabled media; (c) selecting a backup set of data stored in a hard drive of the computer system, the backup set of data includes a default set of boot files and operating system files; (d) creating a spare tire by copying the backup set of data from the hard drive of the computer system to the storage media of the peripheral storage device using a file-based copying scheme; (e) enabling peripheral storage device to incrementally copy portions of the backup set of data from the hard drive of the computer system during normal use; (f) determining whether a failure occurs with the hard drive that disables booting to the hard drive; and (g) booting the computer system from the peripheral storage device using the spare tire. In this manner, the user can resume uninterrupted work from the peripheral storage device while the hard drive failure is repaired.

In another embodiment, a system is disclosed for protecting a user's productivity upon detecting a failure with a storage media of the user's computer system, and the computer system has a peripheral storage device connected thereto. The system includes a removable storage media that is configured to be placed into the peripheral storage device. The removable storage media is formatted to be a protection enabled media and is configured to contain a backup set of data including a default set of boot files and operating system files, and the backup set of data is substantially continuously backed up on a schedule. The system further includes a spare tire launcher that may be launched when the failure with the storage media of the user's computer system occurs to enable the user to re-boot to the peripheral storage device which contains a selected duplicate image of contents of the storage media of the user's computer system.

In yet a further embodiment, an apparatus for protecting data of a computer system that has a peripheral storage device connected thereto is disclosed. The apparatus includes: (a) means for preparing a storage media of the peripheral storage device to be a protection enabled media; (b) means for selecting a backup set of data stored in a hard drive of the computer system, the backup set of data includes a default set of boot files and operating system files; (c) means for creating a spare tire backup set by performing a file-based copying operation that transfers the backup set of data to the storage media of the peripheral storage device even when the storage media of the peripheral storage device is different than a media of the hard drive; (d) means for enabling peripheral storage device to incrementally copy portions of the backup set of data from the hard drive of the computer system during normal use after the means for creating the spare tire is complete; (e) means for determining whether a failure occurs with the hard drive that disables booting to the hard drive; and (f) means for booting the computer system from the peripheral storage device.

In still another embodiment, a computer readable media containing program instructions for protecting data of a computer system that has a peripheral storage device connected thereto is disclosed. The computer readable media contains: (a) program instructions for causing preparation of a storage media of the peripheral storage device to be a protection enabled media; (b) program instructions for enabling a selection of a backup set of data stored in a hard drive of the computer system, the backup set of data includes a default set of boot files and operating system files; (c) program instructions for enabling a generation of a spare tire backup that includes the backup set of data to the storage media of the peripheral storage device; (d) program instructions for enabling the peripheral storage device to incrementally copy portions of the backup set of data from the hard drive of the computer system during normal use; and (e) program instructions that enable booting the computer system from the peripheral storage device when a failure occurs with the hard drive that disables booting to the hard drive.

In another embodiment, a system for protecting data stored in a primary hard disk drive of a computer system is disclosed. The method includes: (a) connecting a secondary peripheral storage device to the computer system; (b) preparing a storage media of the secondary peripheral storage device to be a protection enabled media; (c) selecting a backup set of data stored in the primary hard disk drive of the computer system, and the backup set of data includes a default set of boot files and operating system files; (d) creating a spare tire backup by performing a file-based copying operation of the backup set of data from the primary hard disk drive of the computer system to the storage media of the secondary peripheral storage device; (e) enabling the secondary peripheral storage device to incrementally copy portions of the backup set of data from the primary hard disk drive of the computer system during normal use; and (f) booting the computer system from the secondary peripheral storage device when a failure occurs with the primary hard disk drive which is detected by a system BIOS of the computer system.

A system for protecting a user's productivity upon detecting a failure with a storage media of the user's computer system is also disclosed in another embodiment. The system includes a secondary peripheral storage device having a storage media that is formatted to be a protection enabled media and contains a backup set of data including a default set of boot files and operating system files. The backup set of data is configured to be substantially continuously backed up on a schedule. The system also includes a host adapter BIOS that is configured to receive an indication from a system BIOS that the failure has occurred with the storage media of the user's computer system. The host adapter BIOS is further configured to provide an option of re-booting the user's computer system from the secondary peripheral storage device. The system further includes a computer user interface for providing options of repairing the storage media, restoring the storage media, or continue working from the secondary peripheral storage device until the storage media is repaired and restored.

Yet another embodiment of a system for protecting a user's productivity upon detecting a failure with a storage media of a primary drive of the user's computer system is disclosed. The system includes a secondary peripheral storage device having a storage media that is formatted to be a protection enabled media and contains a backup set of data. The backup set of date includes a default set of boot files and operating system files, and the backup set of data is intervally backed up. The primary drive has a modified MBR sector, a signature on a second sector following the modified MBR sector, and a continuation of a boot management code that is also within the modified MBR sector. The continuation of the boot management code is contained in sectors beginning with a third sector following the second sector counting in an LBA format. In this manner, when the failure occurs with the primary drive, the boot management code will identify drives connected to the computer system and enable booting to the secondary peripheral storage device upon re-boot.

Advantageously, the backup and restore system of the present invention is designed to intelligently protect a user's data and productivity upon experiencing a hard disk failure. In one embodiment, once the backup and restore system is installed and set-up, the backup operations are performed in an incremental fashion (e.g., after the initial full backup, only those files that have changed from one backup to another will be backed up) to a peripheral storage device media. It should be appreciated that this incremental backup technique provides a powerful level of performance enhancement over conventional backup systems.

Most importantly, the intelligent backup and restore system of the present invention will substantially eliminate the tremendous downtime that is typical of when a hard disk crash is experienced and no backup or simple conventional backup techniques are used. As a result, user productivity will no longer suffer when hard disk failures occur. In addition, the embodiments of the present invention also assist the user in attempting to repair of the crashed hard disk. However, if the crashed hard disk is not repairable, the system will automatically detect when a new hard disk is added to the user's system, and then assists in partitioning and formatting the hard disk for the user. When a new hard disk is prepared or the old hard disk is repaired, the system will restore the operating system and data files to their current state as now present on the peripheral storage device media. Upon re-booting, the newly restored hard disk will once again become the boot device. Another advantage of the present invention is that the peripheral storage device media does not have to be identical to that of the system's hard drive. More specifically, even though most computer systems implement IDE/EIDE hard drives, the peripheral storage device (that is internal or external) does not have to be an IDE/EIDE drive. Although they can be the same, they may be of any type, standard, or size other than that of the computer system. Further yet, because the peripheral storage device media may be of a different kind and size than that of the computer system, when the spare tire backup is created, a file-based copying operation is advantageously implemented.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 10B through 10E illustrate the intelligent partitioning performed on the peripheral storage device media when one or more logical local hard drives are present on the host computer system in accordance with one embodiment of the present invention.

DETAILED DESCRIPTION OF THE PREFERRED EMBODIMENTS

An invention is described for an intelligent backup and restore system that prevents downtime productivity losses, and assists the user in trouble shooting the failure, repairing the failure if possible, and restoring the failed system back to its pre-failure condition. It will be obvious, however, to one skilled in the art, that the present invention may be practiced without some or all of these specific details. In other instances, well known process operations have not been described in detail in order not to unnecessarily obscure the present invention.

In the following description, the intelligent backup and restore system will be referred to by its development name "Genesis," however, emphasis will be placed on describing the technical functionality and software interactions between its various components, a host computer system's operating system, and peripheral storage devices and associated media.

Figure 1A:
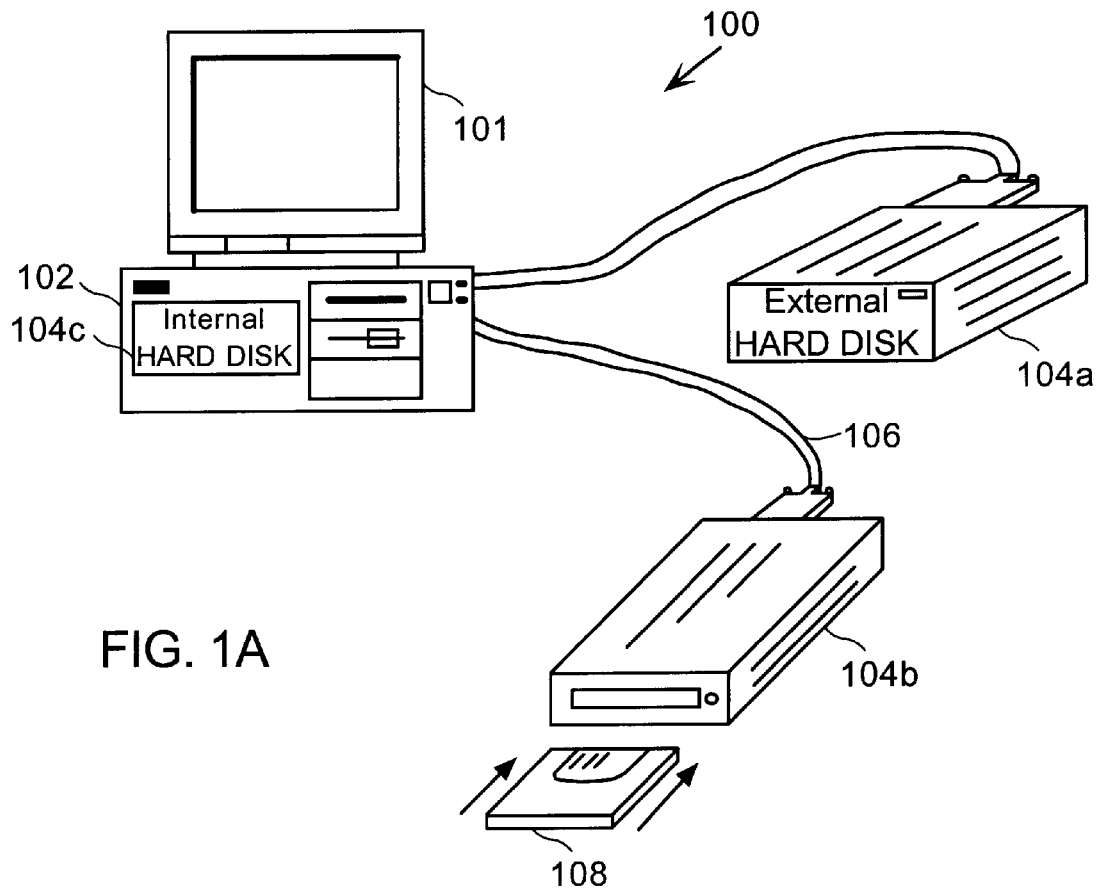
FIGS. 1A and 1B show simplified diagrams of a computer system being connected to a peripheral storage device in accordance with one embodiment of the present invention.

FIG. 1A shows a simplified diagram of a computer system 100 that includes a computer monitor 101 and a computer housing 102 that includes, among other standard hardware/software components, a central processing unit (CPU), memory (i.e., ROM and RAM), and a mother board having PCI slots. The computer housing 102 is shown connected to two exemplary peripheral storage devices, such as an external hard disk 104*a* and a removable media storage device 104*b*. The computer housing 102 typically includes a standard hard disk (not shown), and in one embodiment of the present invention, the computer housing 102 can also including a extra internal hard disk 104*c*. Although examples of three different types of peripheral storage devices 104*a*, 104*b* and 104*c* are provided to illustrate the modularity of the intelligent backup and restore protection system of the present invention, only one extra peripheral storage device 104 is actually needed.

Figure 1B:
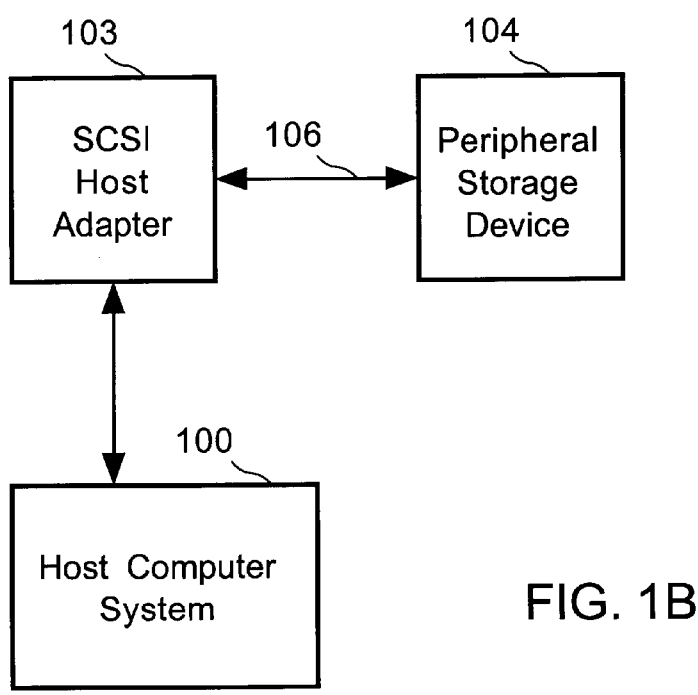

Preferably, the peripheral storage device 104 is connected to a SCSI host adapter 103 via a SCSI cable 106. As shown in FIG. 1B, the SCSI host adapter 103 is connected to a PCI bus slot of the host computer system 100, which enables connection to the peripheral storage device 104. In addition, the computer system 100 may include a CD-ROM drive (e.g., an ATAPI CD-ROM Drive) which will facilitate the installation of the Genesis software components from a CD-ROM media. Of course, in another embodiment, the Genesis software may also be downloaded from an appropriate world wide web Internet site upon purchasing a suitable license.

Although other communication protocols can be used, SCSI communication links are preferred due to their fast speeds and simple to use modularity. In a preferred embodiment, the peripheral storage device 104 can either be a Jaz™ drive that is available from Iomega Corporation of Roy, Utah, or a second hard disk drive (internal or external). When the peripheral storage device 104 is a Jaz™ drive, a cartridge 108 is preferably a Jaz™ drive cartridge, or other suitable storage media cartridge that is capable of storing a large volume of data. Even though larger capacity media cartridges will be available in the future, today, Jaz™ drive cartridges come in 1 (GB) Gigabyte and 2 (GB) Gigabyte sizes, and either size may be used depending on the user's backup needs. Of course, the larger the better.

The SCSI host adapter 103 is preferably a host adapter that is enabled with a special Adaptec Inc. BIOS that allows users to boot up their computer's from the peripheral storage device 104. The special Adaptec Inc. BIOS is available on Adaptec's AHA-2930CU SCSI Host Adapter and other future host adapters, which are or may be available from Adaptec Inc. of Milpitas, Calif. In this manner, when a hard disk failure occurs, the special Adaptec Inc. BIOS will allow the user to boot from the peripheral storage device 104 and continue working until the failure is fixed. In a preferred embodiment, the cartridge 108 media (or the second hard disk) will not only contain valuable data, but will also include the user's operating system (OS) and other important software programs.

For example, when boot control is passed to the peripheral storage device 104, the user's system will boot to its preferred OS (i.e., Windows 95, Windows 98 or Windows NT) seamlessly. In this manner, the user can run their programs, such as, Microsoft Office™, receive and send E-mail, browse the Internet, access their important files, etc., just as if the system never experienced a hard disk crash. Of course, only those software applications selected for back up by the user will be available when booting to the peripheral storage device 104.

Figure 2:
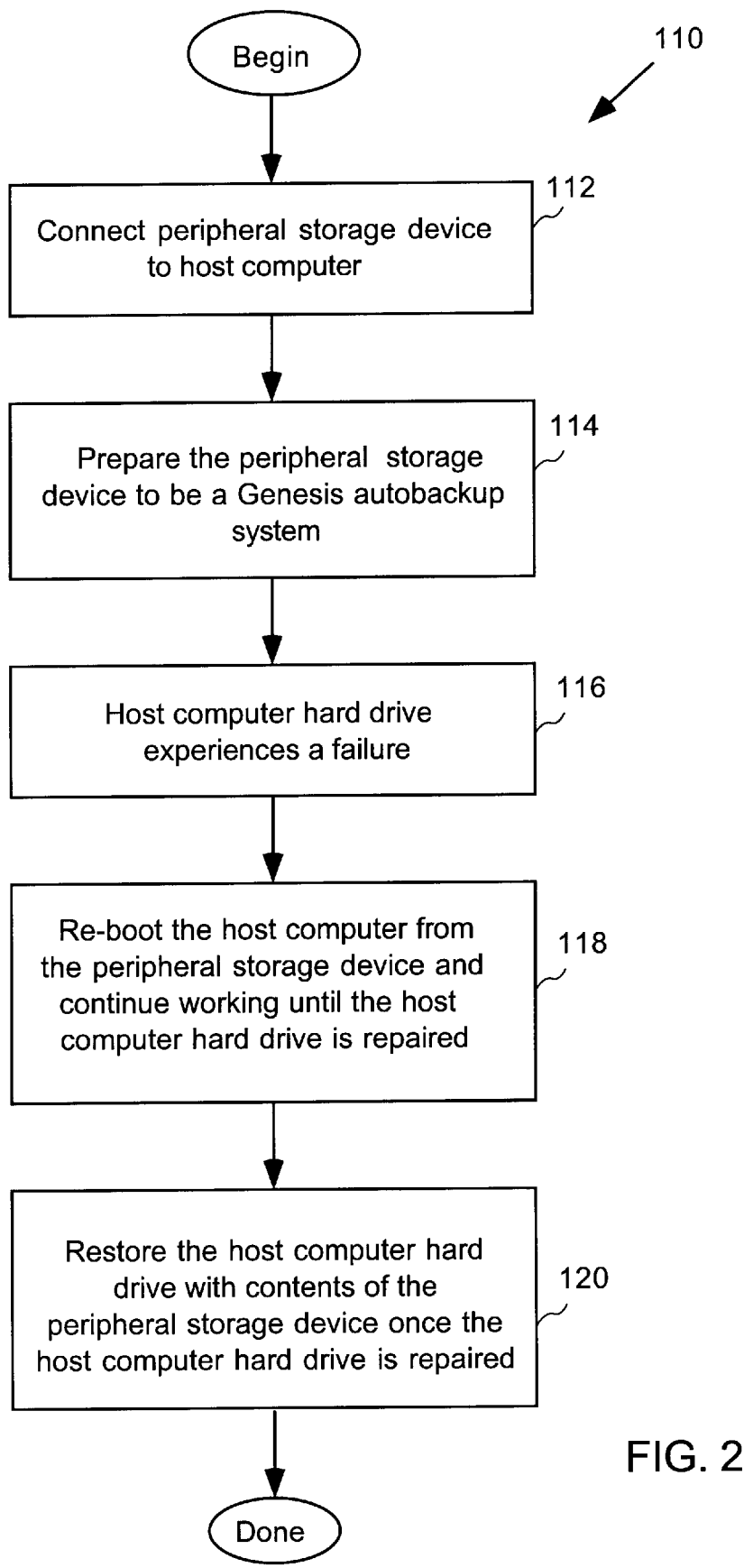
FIG. 2 shows a simplified flowchart diagram illustrating the intelligent backup protection provided by one embodiment of the present invention.

FIG. 2 shows a simplified flowchart diagram 110 illustrating the intelligent backup protection provided by one embodiment of the present invention. The method begins at an operation 112 where the peripheral storage device 104 is connected to the host computer system 110 via a suitable SCSI cable 106, that is connected to a SCSI host adapter.

Once the peripheral storage device has been appropriately connected in operation 112, the method proceeds to an operation 114 where the peripheral storage device (i.e., the media of a cartridge or a hard disk) is prepared to be a Genesis enabled backup system.

To be a Genesis backup system, the peripheral storage device is first verified to be appropriately installed and connected to a suitable SCSI host adapter. As mentioned above, the SCSI host adapter is preferably an Adaptec AHA-2930CU SCSI host adapter that contains a special BIOS that enables booting the host computer system from the peripheral storage device 104, even if an EIDE hard drive is connected to the host computer system. The ability to boot the computer to a SCSI peripheral device is described in greater detail in a U.S. patent application entitled "Method for Selectively Booting from a Desired Peripheral Device", having U.S. patent application Ser. No. 09/016,764, filed on Jan. 30, 1998, and assigned to the assignee of the present application. This application is hereby incorporated by reference in its entirety.

In an alternative embodiment, booting to a selected peripheral device may be accomplished without the need for the special BIOS. To accomplish the booting to the peripheral storage device in this alternative embodiment, a boot select program (BSP) code that is part of the Genesis software is used. As shown below in table 1, an exemplary ABS (adaptec boot select) and master boot record (MBR) layout in zero based logical block address (LBA) format is shown.

TABLE 1

| ABS MBR Layout | | | | | | | |
|---|---|---|---|---|---|---|---|
| 0 | 1 | 2 | 3 | 4 | 5 | 6 | 7+ |
| [MBR] ABS1 Image {Boot Management Code part 1} | Genesis Signature or Boot Signature | ABS 2 Image | | | | | |
| | | {Boot Management Code part 2-overflow from part 1 if needed} | | | | | |

In one embodiment, an installation program is used to generate ABS image codes and a signature that are stored (i.e., written to) on a primary boot drive media as shown in table 1. As used herein, the primary boot drive is typically the EIDE drive (80h) which is used by the system during normal and default operation. In this example, the ABS 1 Image shown above is first loaded into memory and executed by the system BIOS. This code then loads the ABS 2 image into system memory and transfers execution control to it. The ABS 2 Image shown above in table 1 is configured to: (a) look for all Int 13h drives that may be connected to the system; and (b) examine sector 0 (in LBA) of all Int 13h drives for a Genesis Signature, or a Boot signature (to enable booting to the primary drive during normal operation). Preferably, the boot priority is determined by the following order to enable selection of one by the user.

1. Boot Signature.
2. Genesis Signature, if Boot Signature is not found.
3. Primary boot drive, if neither the Boot Signature nor the Genesis signature are found.

Once the boot priority is determined, the decision of whether an Int 13h handler requires installation will have been made. If the desired boot drive is the primary boot drive (80h), it does not have to install its own handler; otherwise, an Int 13h handler is installed to re-order the Int 13h drive numbers in the manner shown in table 2 below.

TABLE 2

| System Default Environment | Boot Drive | ABS Controlled Environment |
|---|---|---|
| 80h | Default | 81h |
| 81h | | 82h |
| 82h | Desired | 80h |
| 83h | | 83h |

Once the boot drive has been identified and the Int 13h handler, if necessary, has been installed, it loads the MBR of the desired boot drive and examines the partition table (the partition table is typically the last 66 bytes of the MBR sector which has 512 bytes). If an active partition is not found, it must go back to find an alternate boot drive. If an active partition is found, it is determined whether the partition requires Int 13h extension support by checking the partition type and if the boot sector resides within the first 8.4 GB. If Int 13h extension is not required to load the boot sector, a regular Int 13h command is used to load the boot sector, validate it by checking the signature and indicate whether the partition is bootable.

If an Int 13h extension is required to load the boot sector, it is determined whether the Int 13h extension is supported. If it is supported, an Int 13h extension command is used to load the boot sector, validate it by checking the signature and an indication is made that the partition is bootable. If not, it must find an alternate boot drive.

After a bootable partition has been identified, a graphical user interface display, such as the example of table 3 below, is provided to the user for selecting a drive to boot from. Once the Genesis software is installed on a system, each time the system is booted, the display of table 3 is provide to the user. However, if the computer is operating normally, the user will usually select (1). It is not until a crash (e.g., or failure) has occurred that the user will desire to boot from (2), which is the case because the designated boot drive (i.e., the primary boot drive) has experienced a failure. In cases where the primary boot drive is completely inoperative, the user may not be able to take advantage of the special booting using the ABS code. In cases such as these, the user may rely on the special BIOS described above, or may also boot to a peripheral storage device using a special floppy disk which enables the selecting of a desired drive to boot from.

TABLE 3

| Please Select (1) or (2) To Boot From. |
|---|
| 1. Designated Boot Drive {Normal Operation} |
| 2. Genesis Drive {Upon Failure} |

If the selected boot drive has a bootable partition, control is transferred to the code on the boot sector. If the selected boot drive does not contain a bootable partition, it must look for an alternate boot drive, as mentioned above, until a bootable partition is found. Although the present invention discloses three ways in which booting to a desired peripheral device can be achieved when the primary hard drive is an EIDE drive (or other type of primary boot drive), other equivalent manners of booting to a desired peripheral storage devices can be used to achieve the benefits of the intelligent backup and restore system of the present invention.

Broadly speaking, the preparation 114 of the peripheral storage device 104 begins when the cartridge 108 is inserted (or an extra hard disk drive is connected), and the user implements a Genesis Preparation Wizard (i.e., in the form of a user friendly graphical user interface) to convert a standard cartridge media (or hard disk media) into a Genesis enabled cartridge. At this point, the user will follow the preparation Wizard and a SpareTire Wizard graphical user interface in order to generate a backup set using file-based copying and activate the intelligent Genesis backup system. After the peripheral storage device 104 and the host's Genesis software have been prepared to be a Genesis enabled backup system, the method will proceed to an operation 116.

For purposes of this example, if the host computer system's hard drive experiences a failure in operation 116, the Genesis backup system will be ready for the user to enable re-booting to the peripheral storage device 104, which will allow the user to continue working until the host computer hard drive is repaired in operation 118. The ability to continue working after the host computer system's hard drive has experienced a failure is a powerful feature which assists in enabling a user to maintain his or her productivity, even when the host computer system may have a serious problem that may require extensive work or complete replacement of the hard drive.

Next, the method proceeds to an operation 120 where the host computer hard drive will be restored (using the Spare-Tire Wizard) with the contents of the peripheral storage device 104 once the host computer hard drive has been repaired. This ability to continue working while the computer system hard drive is being repaired and then subsequently revert back to work from the host computer's hard drive has the power of eliminating the loss in productivity experienced by users of today's complex and powerful computer systems.

Figure 3A:
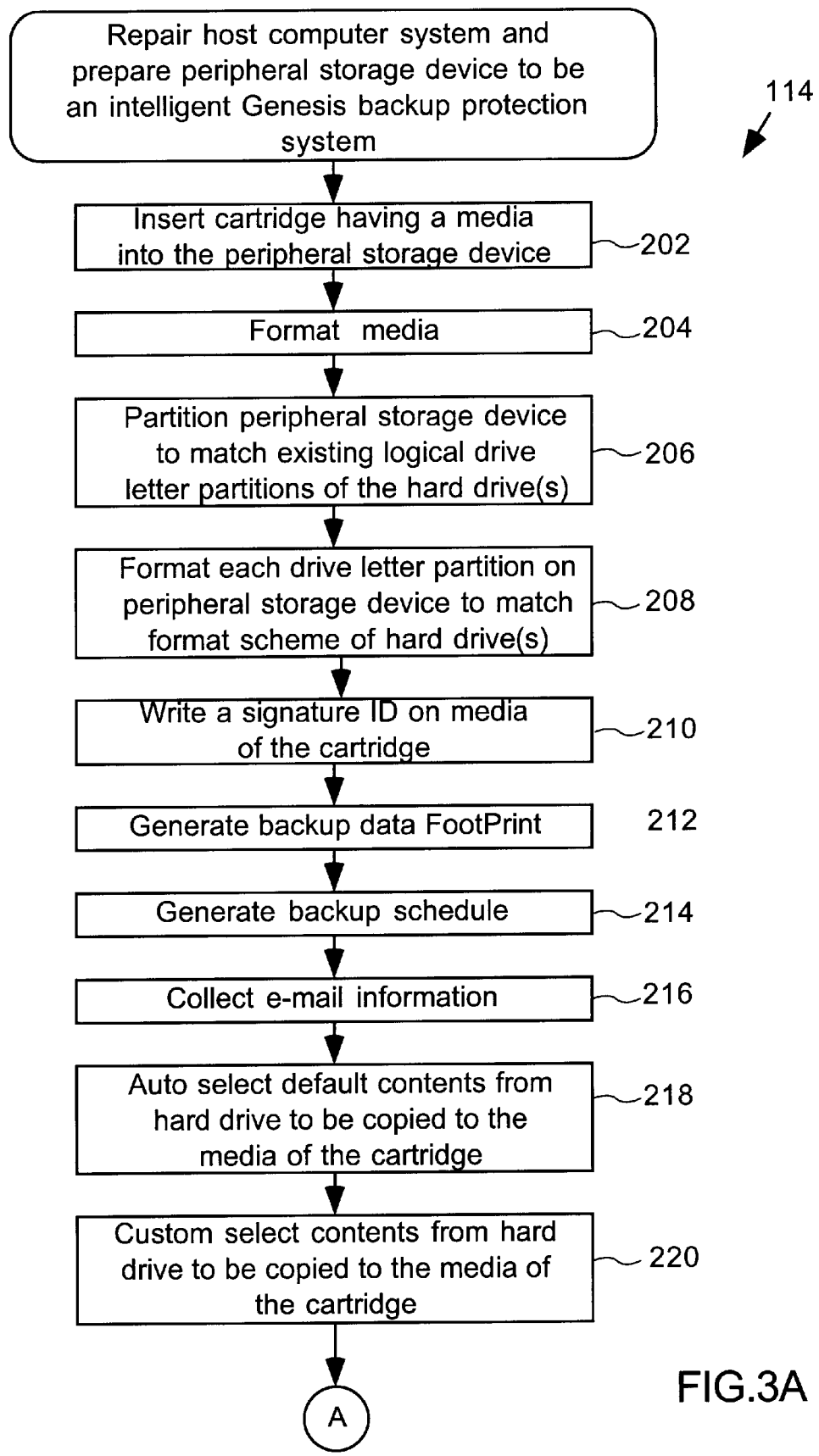
FIGS. 3A and 3B show more detailed flowchart diagrams of the method operations performed in preparing the host computer system and peripheral storage device to be an intelligent Genesis backup protection system in accordance with one embodiment of the present invention.

FIG. 3A shows a more detailed flowchart diagram 114 of the method operations performed in preparing the host computer system and peripheral storage device to be an intelligent Genesis backup protection system in accordance with one embodiment of the present invention. In the following examples, it will be assumed that the selected peripheral storage device is the Jaz™ drive, however, these examples are equally applicable to when a second hard disk drive is the selected peripheral storage device.

The method begins at an operation 202 where a cartridge having a storage media is inserted into the peripheral storage device. As mentioned above, the cartridge is preferably an Iomega Jaz™ drive cartridge which is capable of storing a large amount of data. Of course, other suitable peripheral storage devices and cartridges may also be used with appropriate modifications. Once the cartridge has been inserted into the peripheral storage device, the method proceeds to an operation 204 where the storage media is formatted.

After the media has been formatted, the peripheral storage device media is partitioned to match existing logical drive letter partitions of the hard drive or drives of the host computer system. The method then proceeds to an operation 208 where each drive letter partitioned on the peripheral storage device media is formatted to match the format scheme of the hard drive(s). Once formatted, the method proceeds to an operation 210 where a Genesis signature ID is written on the media of the cartridge. Preferably, the signature ID is written in one or more sectors after the master boot record (MBR) sector of the media. The signature ID will therefore identify this particular cartridge as being a Genesis enabled cartridge which, when inserted into the peripheral storage device, will be detected by the computer's host adapter BIOS and indicate that the intelligent backup is able to commence.

On the other hand, if a non-Genesis-enabled cartridge (i.e., one not prepared as above) is inserted into the peripheral storage device, the peripheral storage device will operate normally without performing the intelligent backup protection. Alternatively, if the peripheral storage device were a second hard disk drive, the intelligent backup and restore protection system will generally be in a ready state. The method now proceeds to an operation 212 where a backup data FootPrint is generated. This initial FootPrint is referred to herein as a "before image." In general, the FootPrint is configured to detect and list all hardware (i.e., hard drives and controllers). In this manner, the intelligent Genesis backup protection system will be able to trouble shoot what the source of a failure may be (i.e., to determine which hard drive may have failed). Specifically, when a failure occurs, a new FootPrint image is created. This FootPrint image is referred to as an "after image."

By comparing the "before" and "after" image files, the intelligent Genesis backup system will know or at least narrow down what the cause of the failure was, and can then take appropriate actions to repair the problem (or suggest a solution). After the backup data FootPrint is generated in operation 212, the method proceeds to an operation 214.

In operation 214, a backup schedule is generated. Specifically, users will have the option of selecting when incremental backups will occur during normal operation. Some of the options will include performing the incremental backups during startup, shut down, during screen saver periods, and/or when a certain amount of inactivity occurs. As used herein, an "incremental" backup means that only those files or data that are newer than that previously backed up will be backed up again in order to eliminate the need for very long backup sessions. The custom scheduling of the backup operations also enables users to set up the backups for when it is most convenient to the individual user, depending on his or her work habits.

Once the backup schedule is generated in operation 214, the method proceeds to an operation 216 where the intelligent Genesis backup protection system will prompt the user to provide an E-mail address of his or her computer support personnel. In this manner, if a failure occurs with the host computer system's hard drive (or some type of system failure), the intelligent Genesis backup protection system will automatically send an E-mail to the computer support personnel who will be informed that the hard drive of the computer system has experienced a failure, and may provide an indication of what the problem may be. Once the E-mail information has been collected in operation 216, the method proceeds to an operation 218.

In operation 218, default contents from the hard drive are auto selected to be copied to the media of the cartridge. In this operation, the auto selected contents will be standard boot files that are critical to the booting process and operating system files. The method then proceeds to an operation 220 where contents from the host computer system's hard drive are custom selected to be copied to the media of the cartridge. In this operation, the user is provided with a Genesis X-file viewer interface, which provides the user with a Windows Explorer-like directory of the hard drive's data. From this user friendly interface, the user is allowed to select (i.e., by checking a box or the like) which files will be tracked for incremental backups by the intelligent Genesis backup protection system.

Figure 3B:
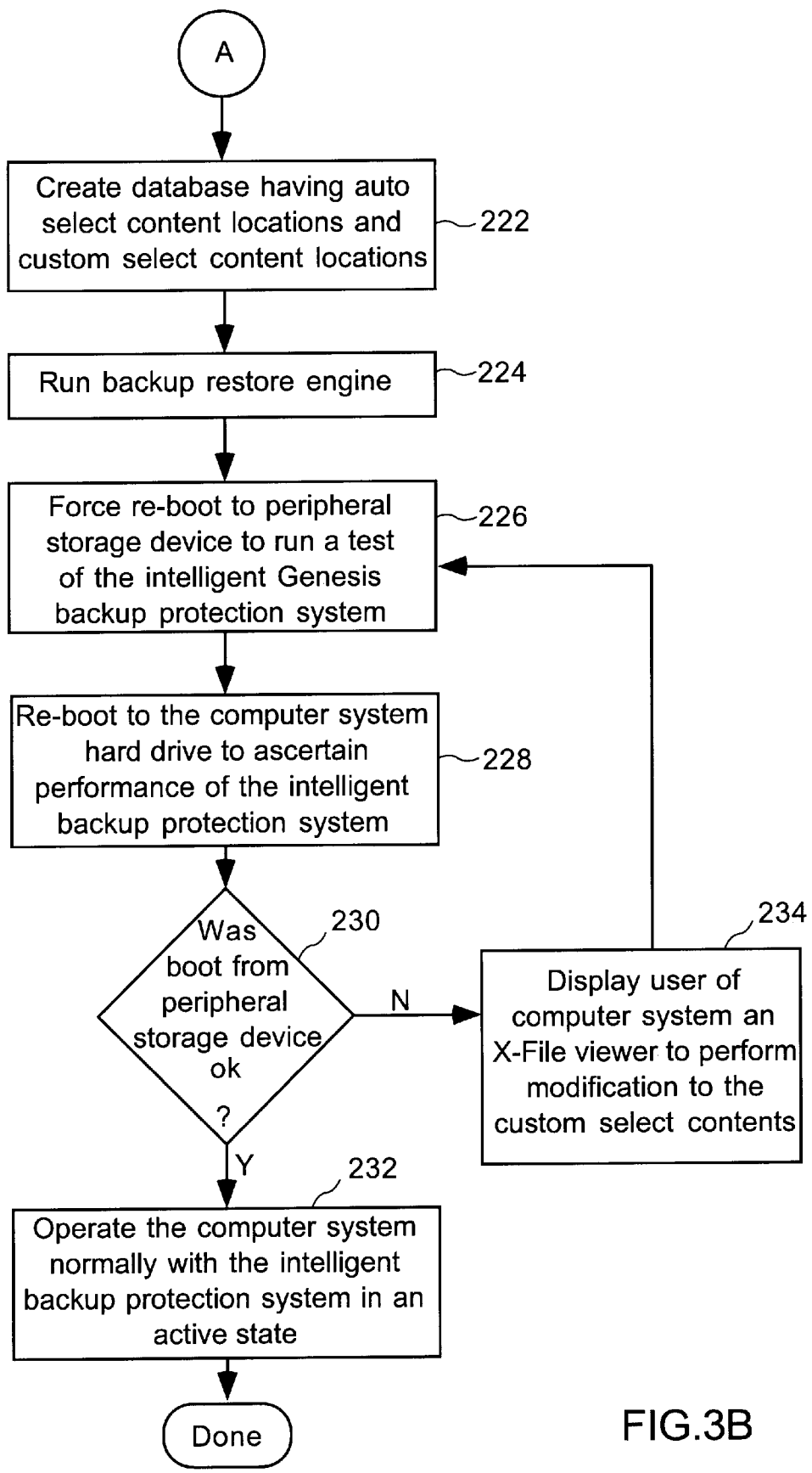

In one embodiment, if the host computer system's hard drive is smaller than the capacity of the cartridge media, the user may choose to make a complete replica of the entire contents of the hard drive. In this manner, when a computer failure occurs, the user will be able to continue working from the identical contents of the peripheral storage device while the computer system's hard drive is repaired. From operation 220, the method proceeds to a pointer A as shown in FIG. 3B.

Once the contents of the initial backup set have been selected, a database having the auto selected content locations and custom select content locations is created. This database is generally a text file having pointers to the various selected applications and files that are on the computer system's hard drive. In one embodiment, the aforementioned X-file viewer is responsible for generating the database, which is constructed using the custom selected data.

When the X-file viewer has created the database, the method proceeds to an operation 224 where a backup restore engine is run. The backup restore engine is configured to copy all of the information that is selected in the database to the media of the peripheral storage device. In general, the backup restore engine is responsible for handling the file-based copying process from the user source drive(s) to the peripheral storage drive, as well as from the peripheral storage drive to the user's hard drive. Its basic operation includes receiving paths to the files (called the source), and copying them to the proper backup and restore location (called the destination). File-based copying is a powerful feature which enables copying data between media having different sizes, configurations, and operating under different standards. In addition to the basic copying process, this engine is responsible for maintaining file attributes after being copied (e.g., hidden files will remain hidden on the destination drive).

The backup restore engine is also capable of maintaining security attributes for files under NTFS. In general, to ensure that older files do not overwrite newer files, the engine is also configured to avoid copying files if the destination is newer than the source. The backup restore engine is also charged with performing Virus checking on all files before the copying is performed. In this manner, any detected Viruses are disinfected prior to performing any copying operations.

From operation 224, the method proceeds to an operation 226 where a re-boot to the peripheral storage device is forced to run a test of the intelligent Genesis backup protection system. As mentioned before, the peripheral storage device may be a Jaz™ drive (or a second hard drive) which is connected to the computer via a SCSI cable and a SCSI host adapter. Next, the method proceeds to an operation 228 where the computer system is again re-booted to the computer system's hard drive to ascertain the performance of the intelligent backup protection system.

The method now proceeds to a decision operation 230 where it is determined whether the boot from the peripheral storage device was O.K. If the booting to the peripheral storage device was O.K., the method proceeds to an operation 232 where the computer system is allowed to operate normally with the intelligent backup protection system in an active state. In general, the backup protection system will work automatically in the background without disturbing the user during normal operation.

Referring back to operation 230, if the boot from the peripheral storage device was not O.K., the user is provided with an X-file viewer to enable the user to perform modifications to the custom selected contents for backup. Once the user has made the appropriate modifications to the selected contents, the method will again proceed to operation 226 where re-booting to the peripheral storage device is again forced to run a test of the intelligent backup protection system. Once the boot from the peripheral storage device has been determined to be O.K. in operation 230, the method will then proceed to operation 232 and the method will end.

Figure 4:
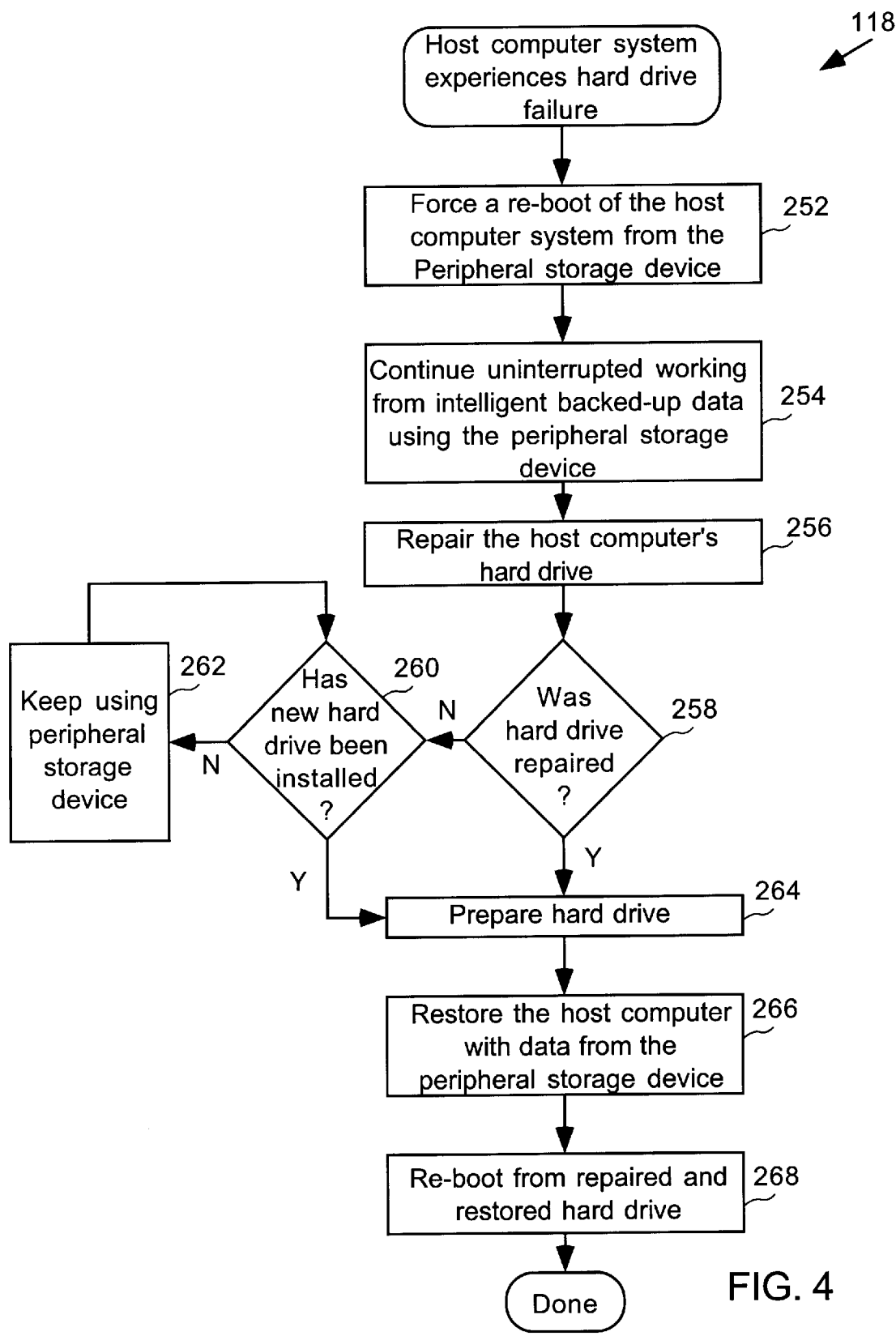
FIG. 4 shows a more detailed flowchart diagram illustrating the operations performed by the intelligent Genesis backup protection system when the host computer system experiences a hard drive failure in accordance with one embodiment of the present invention.

FIG. 4 shows a more detailed flowchart diagram 118 illustrating the operations performed by the intelligent Genesis backup protection system when the host computer system experiences a hard drive failure. The method begins at an operation 252 where the intelligent Genesis backup protection system will automatically prompt the user (via a graphical user interface or text) to re-boot the host computer system from the peripheral storage device, if desired, upon experiencing the hard drive failure which is detected by a system BIOS. Once re-booted to the peripheral storage device, the method will proceed to an operation 254 where the user can continue uninterrupted working from the intelligently backed up data using the peripheral storage device, as if no failure had occurred. While the user is working uninterrupted from the intelligently backed up data of the peripheral storage device, the method will proceed to an operation 256 where the host computer's hard drive will be repaired.

Next, the method will proceed to a decision operation 258 where it is determined whether the hard drive was repaired. If it has not been repaired, the method will proceed to another decision operation 260 where it is determined whether a new hard drive has been installed. If a new hard drive has not been installed, the method will proceed to an operation 262 where the user will keep using the peripheral storage device until the hard drive is repaired or replaced. When the hard drive is repaired or replaced, the method will proceed to an operation 264 where the new hard drive or repaired hard drive is prepared.

The preparation of a new hard drive generally involves partitioning the hard drive in the state it was originally in (i.e., to match the partitions of the peripheral storage device media), and then format the hard drive to its original state. Once the hard drive is prepared in operation 264, the method will proceed to an operation 266 where the host computer is restored with the data from the peripheral storage device media. As mentioned above, the restoring includes copying the data stored on the peripheral storage device media back to the repaired hard drive of the computer system. Once the restoring has been completed in operation 266, the method will proceed to an operation 268 where the computer system is re-booted from the repaired and restored hard drive. At this point, the method will be done.

Figure 5A:
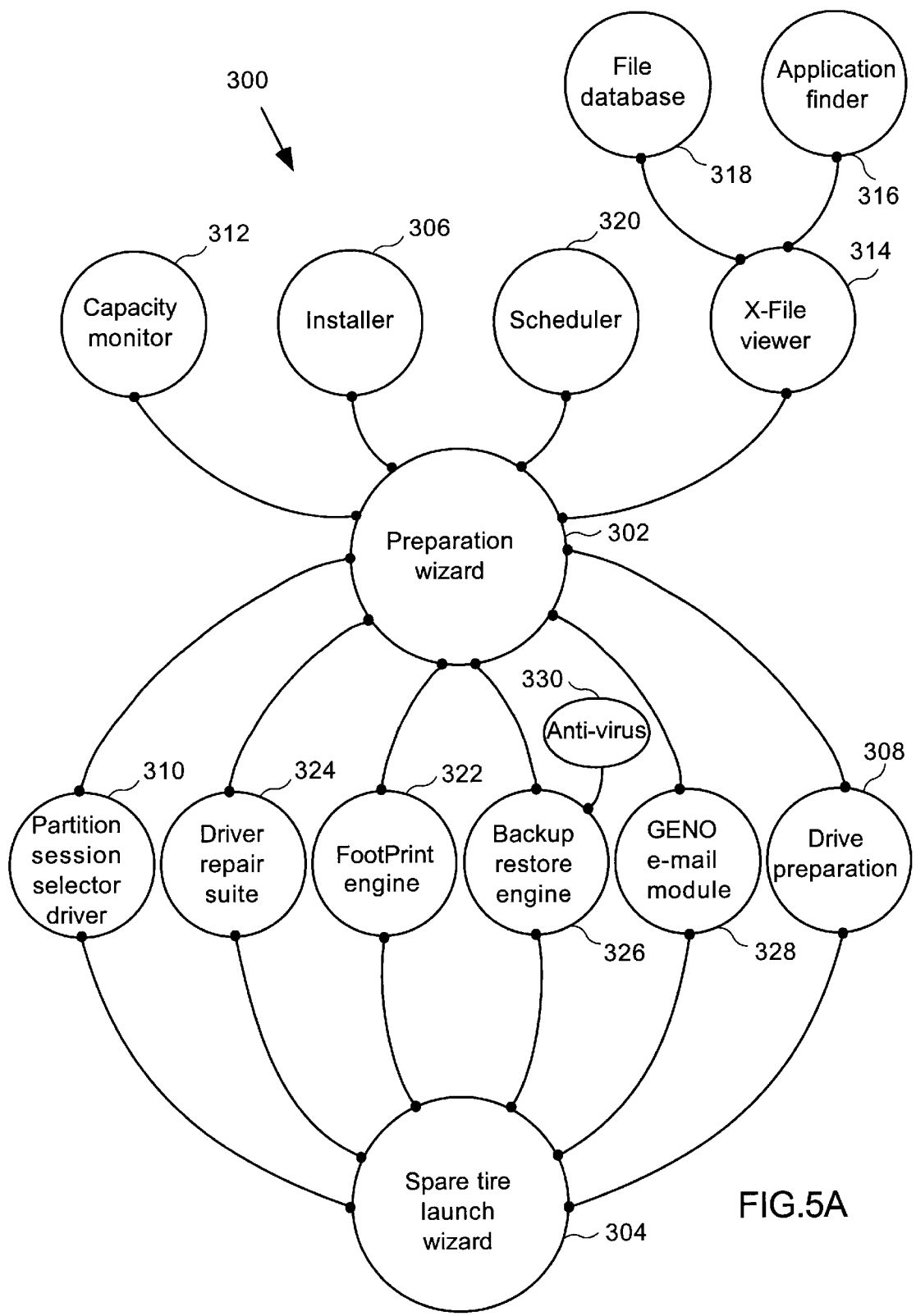
FIG. 5A shows an object representation of software modules and their communication with other modules of the system in accordance with one embodiment of the present invention.

FIG. 5A shows a software object representation 300 in accordance with one embodiment of the present invention. The software object representation illustrates the interactions between the main software components of the intelligent Genesis backup protection system. The two main components of the software object representation 300 include a Preparation wizard 302 and a SpareTire launch wizard 304. The Preparation wizard 302 is a software interface which will interact with various software modules in order to prepare the host computer system and a peripheral device media to be Genesis enabled.

The SpareTire launch wizard 304 on the other hand, is used to enable the user to boot from and work off of the backed up data after an error or failure occurs with the host computer system's hard drive. As shown, the SpareTire launch wizard 304 also interacts with various software components as does the preparation wizard 302. In this example, the preparation wizard 302 is configured to communicate with an installer object 306 which is configured to handle the installation and verification of various registry entries created during the Genesis software installation process. If any keys are missing, the installation object 306 will suggest to the user via the preparation wizard 302 that a re-installation is required.

In addition, the installer object 306 is configured to check whether an appropriate peripheral storage drive is connected to a suitable SCSI host adapter. If the preparation wizard 302 is unable to detect the special BIOS from the SCSI host adapter that enables booting to the SCSI peripheral device, the preparation wizard 302 will notify the user and explain to the user how an upgraded BIOS can be obtained. As mentioned above, the detailed functionality of this special BIOS is described in the previously incorporated by reference, U.S. patent application Ser. No. 09/016,764, filed on Jan. 30, 1998.

The preparation wizard 302 is also in communication with a drive preparation object 308. The drive preparation object 308 is responsible for preparing the peripheral storage device to be a Genesis enabled system. The preparation generally includes partitioning the media of the peripheral storage device, formatting the partitions, and writing the Genesis signature ID to the media. Generally, the peripheral storage device media will be partitioned to match the number of logical drive letter partitions of the host computer system hard drive(s). The drive preparation object 308 is also charged with preparing a new hard disk when the computer system's hard disk is not repairable, and a new hard disk is installed when the SpareTire launch wizard 304 is in control.

The preparation of a new hard disk typically includes detecting that a new hard disk is installed (i.e., which is possible because of the Footprint), verification of the physical media, partitioning, and formatting. In order to detect a new hard disk, the SpareTire launch wizard 304 will search for a matching entry in the FootPrint image file, and when detected in the FootPrint file, this will indicate that a new device has been added (i.e., the new hard disk). Using this method, it is also possible to detect all other properties about the device, which are attached to the new entry in the Footprint.

In one embodiment, the partitions of the host computer system are those defined by drive letters of a Windows-type operating system (OS). In this embodiment, the partitioning may be performed by using a GUI partitioning utility, such as one provided as part of an Adaptec Inc. EZ-SCSI program, which is available from Adaptec, Inc. of Milpitas, Calif. During the initial drive preparation, the peripheral device storage media may be erased in order to ensure that all data is removed before the media is identified to be a Genesis enabled media. In addition, the drive preparation object 308 will be configured to verify the media. The media may be verified by scanning the entire media surface on a sector-by-sector basis. Bad sectors will be noted in the file allocation table (FAT) when the disk is formatted so that they are not used for backup. During formatting, the drive may be formatted to FAT-16 for Windows 95/98 and Windows NT. For Windows 95/98 OSR-2 configurations, formatting to FAT-32 will also be an option for the user. In addition, NTFS will also be available for Windows NT.

Figure 5B:
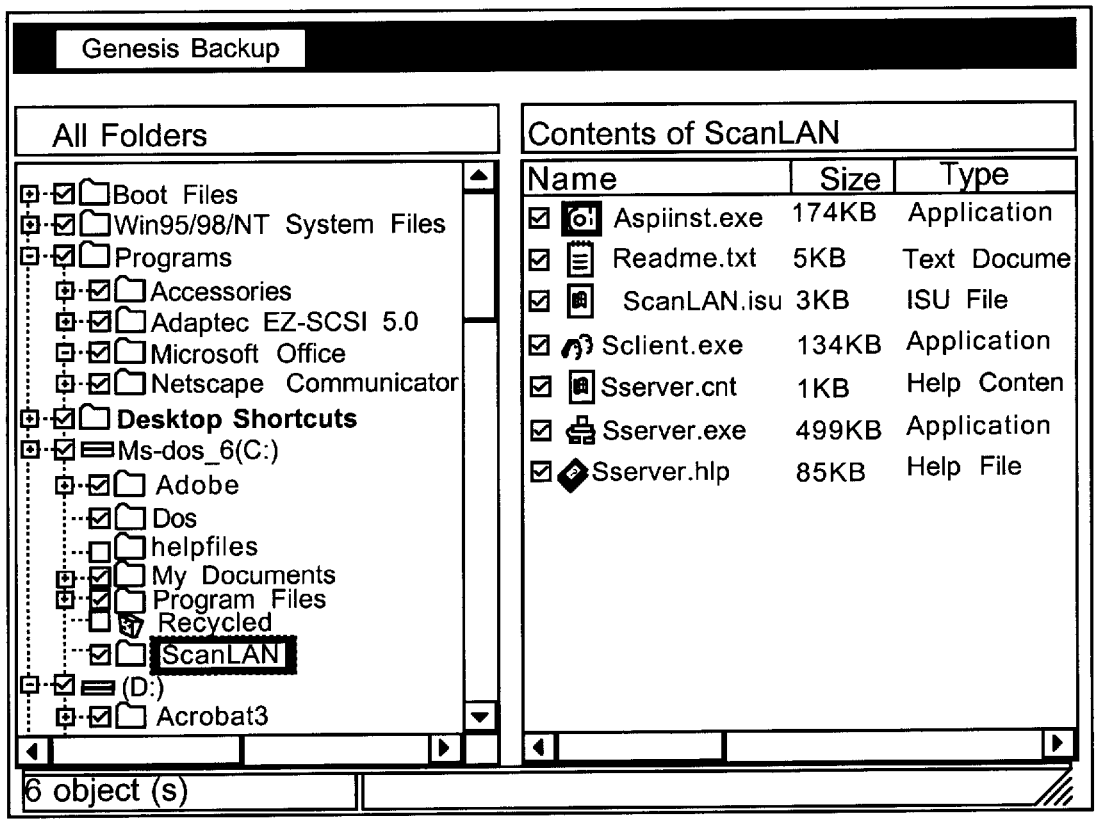
FIG. 5B is an exemplary graphical user interface of an X-file viewer in accordance with one embodiment of the present invention.

The preparation wizard 302 is also coupled to an X-file viewer 314 which allows the user to select which programs and files are to be incrementally backed up by the intelligent Genesis backup protection system. As shown in FIG. 5B, an exemplary X-file viewer is shown having selection boxes next to those programs, folders and files which are to be backed up by the intelligent backup system. In this example, the boot files and the Windows 95 system files are automatically selected by default to be backed up by the intelligent backup system. However, the user is allowed to selectively identify and check those boxes for programs, folders and files which are also to be backed up by the intelligent backup system.

The preparation wizard 302 is further shown in communication with a capacity monitor 312, which is charged with ensuring that no more than an allowed amount of data is targeted for certain partitions of the peripheral storage device media. In general, the capacity monitor 312 will ensure that only a percentage of each partition will be allocated when the user is selecting programs for the intelligent backup operations of the Genesis system. In this manner, enough space remains in each partition for subsequent incremental backups during normal operation.

However, eventually one or more of the partitions of the peripheral storage device will become filled. At that time, the user will be required to perform a refresh of the peripheral storage device media, which is substantially similar to the initial backup. Upon the refresh operation, newly calculated partition sizes are made in order to allow for additional space on each of the partitions for more incremental backups.

Once the user has implemented the X-file viewer 314 to select those programs, files and folders which should be incrementally backed up, a file database 318 will be generated by the X-file viewer. The file database will essentially be a list of those selected items and their locations on the various local logical drive letters of the computer system. The X-file viewer 314 is also in communication with an application finder 316 which enables the X-file viewer to find those programs (and all associated components) which are logically contained within the various partitions and associated drives as shown in FIG. 5B.

The Preparation wizard 302 is also in communication with a scheduler 320 which will provide a user the option of selecting when the incremental backups are to occur. As mentioned above, some of the options will include backing up at startup, shutdown, during a screen saver period, or even during operation. The incremental backups are responsible for updating the peripheral storage device media, in this embodiment, when those files have been modified since the last backup in order to reduce the amount of time spent during backup sessions.

The preparation wizard is also in communication with a FootPrint engine 322 which is configured to detect and list all hardware components in an image file in order to identify the source of the failure that resulted in the booting to the peripheral storage device media. As mentioned above, this image file is created and copied to the peripheral storage media during the initial backup, after each boot to a normal working system, and with each incremental backup operation. In one embodiment, the image file will contain the items identified in table A below.

TABLE A

Operating System

Version
Location
List of Peripherals

Device indexes (e.g., DEVICE00) referencing another part of the footprint file containing detailed information about the corresponding device.
Registry path of device
Hardware device address (e.g., SCSI target/LUN or IDE master/slave)
"Inquiry" data including vendor, model and revision
Partition data (i.e., size, type, file-system)
Drive-letter mappings TABLE A-continued Controller Cards Controller indexes (e.g., CONTROLLER00) referencing another part of the footprint file that contains detailed information about the corresponding controller.
Type (e.g., EIDE/SCSI)
Configuration information (e.g., I/O Port, IRQ, DMA, etc.)
List of attached devices (reference to peripheral section)
Time stamp (e.g., when was the FootPrint image created)

A majority of the above information will come from the Registry, which makes it very easy to construct by eliminating the need to probe hardware. This information is then written to a file in text format each time a successful boot occurs to the operating system. A copy of this file is stored in the root directory of the hard drive that contains the operating system as well as in the root of the peripheral storage device (i.e., Jaz™ drive). As mentioned above, when the peripheral storage device becomes the boot device, this FootPrint Image File is analyzed and compared to a newly created image file in order to determine which device(s) has failed. The SpareTire Launch Wizard 304 uses this information to inform the user of the failures and suggest a possible course of action to repair the problem.

Another application of the FootPrint Image is one in which new drives are automatically detected for the user. Each time the system is booted, the previous FootPrint image file (before image) is compared to the newly created FootPrint image file (after image). If additional devices are detected, Genesis may notify the user of the new device(s) and proceed to partition and format the new media if desired.

As shown, the SpareTire launch wizard 304 is in communication with a drive repair suite 324. The drive repair suite 324 is the mechanism by which minor hard drive failures can be repaired in order to avoid complete replacement of the failed hard drive. The drive repair suite will only be initiated after a failure has occurred with the host computer system's hard drive and a boot to the peripheral storage device has occurred. The drive repair suite 324 is capable of performing a master boot record (MBR) boot sector repair, file-system repair, media scan for defects, and virus scans. The MBR boot sector repair is performed when a hard drive is no longer bootable because its MBR or boot sector has become corrupt. In such as case, the data is still intact, but the drive is no longer bootable. By repairing the MBR, the drive can once again become bootable.

Additionally, the file system repair may include checking an existing file system structure. This advantageously provides an added level of advanced user functionality. If the file system is corrupt, an attempt can be made to fix it by examining the file system data structures and performing sanity checks. If a fix is possible, the user will be notified and the fix will be attempted. However, in certain circumstances, if the file system is corrupt, the drive will generally have to be reformatted. The drive repair suite 324 is also capable of communicating with an operating system's ScanDisk™ program. The ScanDisk™ program can verify the media on the hard drive to determine its condition. In some cases, bad sectors can be mapped out.

A backup restore engine 326 is also provided in communication with the SpareTire launch wizard 324. The Spare-Tire launch wizard 324 may then access the backup restore engine in order to copy those files that are stored in the peripheral storage device media back to a repaired host computer hard drive. As mentioned above, the backup restore engine is responsible for handling the file copying process from the user's source drives to the peripheral storage device media as well as from the storage device media to the user's hard drive. During the initial backup to the peripheral storage device, the data is first passed through an anti-virus module 330 in order to prevent copying of infected items. Once the virus scan has been completed, the information is verified before being transferred to the peripheral storage device media.

Also provided is a Genesis E-mail Notification Object (GENO), which is responsible for sending an E-mail notification to the computer support staff when the computer system goes down, and the SpareTire launch wizard 304 is initiated.

Further provided is a partition session selector driver 310. The partition session selector driver 310 is in communication with the preparation wizard 302 to enable it to select each partition of the peripheral storage device media one at a time, after it has been partition by the drive preparation object 308. In this embodiment, the ability to select one of the partitions is needed when there was more than one partition associated with the hard drive(s). For example, if the user has a hard drive with two partitions, C: and D:, and a CD-ROM is E:, the Genesis drive will be assigned F:. Even though the Genesis drive will have two partitions, one for C: and D:, it will only be viewed as one partition (i.e., partition F:). The partition session selector driver 310 functionality will be described in greater detail below with reference to FIGS. 10B through 10E.

Figure 6A:
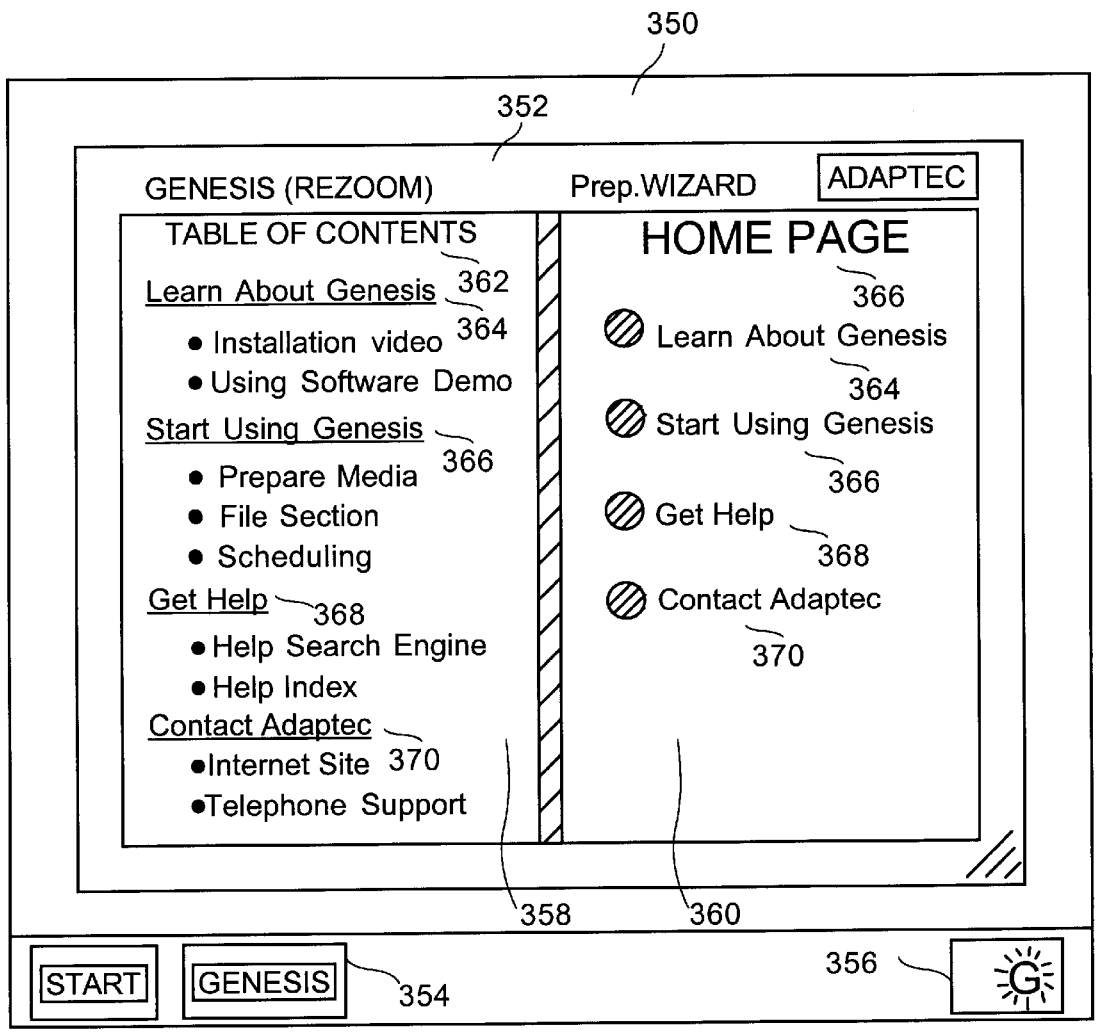
FIG. 6A shows a computer screen illustrating a Genesis Preparation wizard graphical user interface in accordance with one embodiment of the present invention.

FIG. 6A shows a computer screen 350 illustrating a Genesis preparation wizard 352 graphical user interface in accordance with one embodiment of the present invention. Upon the installation of the Genesis software, the preparation wizard 352 will be presented to the user in a Web page look and feel environment. This Web page look and feel environment will enable the user to quickly learn about the features in Genesis, and start using the Genesis product. The preparation wizard graphical user interface 352 is shown having a first frame 358 that includes a table of contents 362, and a second frame 360 that includes a home page 366.

In the table of contents 362, several links are provided to the various preparation wizard Web page installation look and feel. For example, the table of contents includes a Learn About Genesis link 364, a Start Using Genesis link 366, a Get Help link 368, and a Contact Adaptec link 370. For exemplary purposes only, the Learn About Genesis link 364 may include an installation video, and using software demo. The Start Using Genesis link 366 may include sub-menus for preparing the media, file selection, and scheduling. The Get Help link 358 may include a help search engine, and a help index to assist the user during the preparation process. In addition, the Contact Adaptec link 370 may include a link to Adaptec's Internet site, and a telephone support directory.

Once the preparation wizard graphical user interface 352 is used to install the Genesis software and prepare the peripheral storage device media to be a Genesis-enabled media, the intelligent Genesis backup protection system will run in the background. In this manner, the user operating the intelligent Genesis backup protection system will only notice a small icon 356 that may be displayed in a task bar of a Windows (i.e., 95, 98, etc.) or Windows NT (i.e., 3.51, 4.0, 5.0, etc.) platform. Also, when the preparation wizard graphical user interface 352 is activated, the task bar may also include a link 354 to the Genesis program when in a minimized state. Of course, in other operating systems, such as an Apple Computer OS and a UNIX OS, the program may also operate in the background to avoid interrupting a user during normal use.

Upon enabling the intelligent Genesis backup protection system, it will remain in that active state until a failure to the user's hard drive occurs. At that point, the system BIOS will inform the user that an error has occurred with the computer system's hard drive, and the Adaptec BIOS will provide the user with an option to boot the computer system from the peripheral storage device media.

Figure 6B:
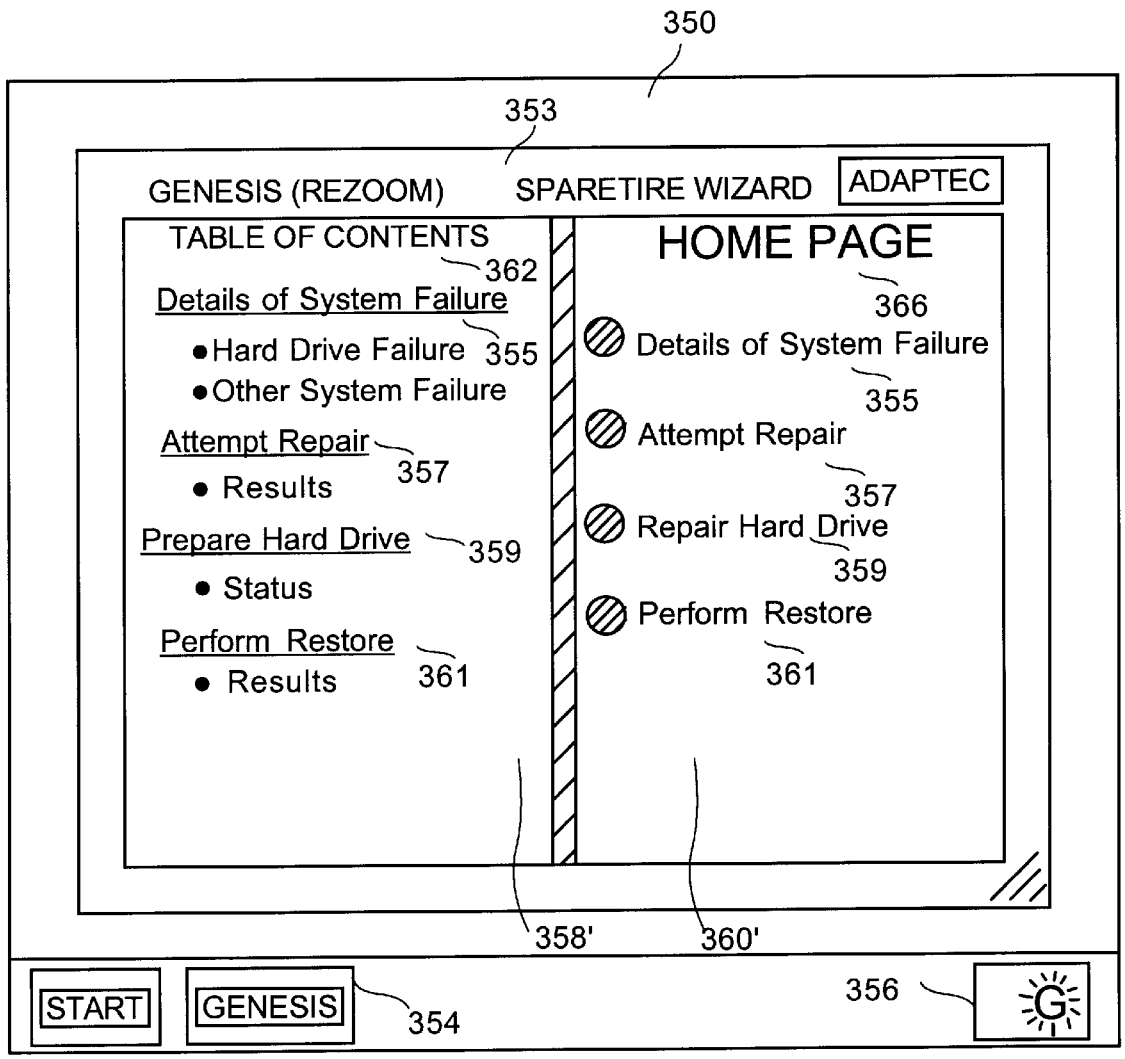
FIG. 6B shows a computer screen illustrating a Genesis SpareTire wizard graphical user interface in accordance with one embodiment of the present invention.

Next, a SpareTire wizard graphical user interface 353 will be provided to the user as shown in FIG. 6B. Upon launching the SpareTire wizard 353, a simple-to-use Web page look and feel user interface is provided to the user for ease of use. In this example, the SpareTire wizard graphical user interface 353 is divided into a first frame 358' and a second frame 360'. In the first frame 358', a table of contents 362 is provided. From here, the user may select details of system failure link 355, attempt repair link 357, a repair hard drive link 359, or a perform restore link 361. Upon selecting any one of the aforementioned links, the user will be provided with more information on performing the desired task. On the other hand, the user may desire to continue working from the peripheral storage device media until the computer support personnel assists in repairing the system failure.

FIGS. 7 through 16 provide a more detailed description of the method operations associated with installing the intelligent Genesis backup protection system, preparing the media of the peripheral storage device to be a Genesis-enabled media, scheduling the intelligent backup increments, creating a SpareTire, launching the SpareTire, booting to the peripheral storage drive after failure to continue working, and performing a restore operation.

Figure 7:
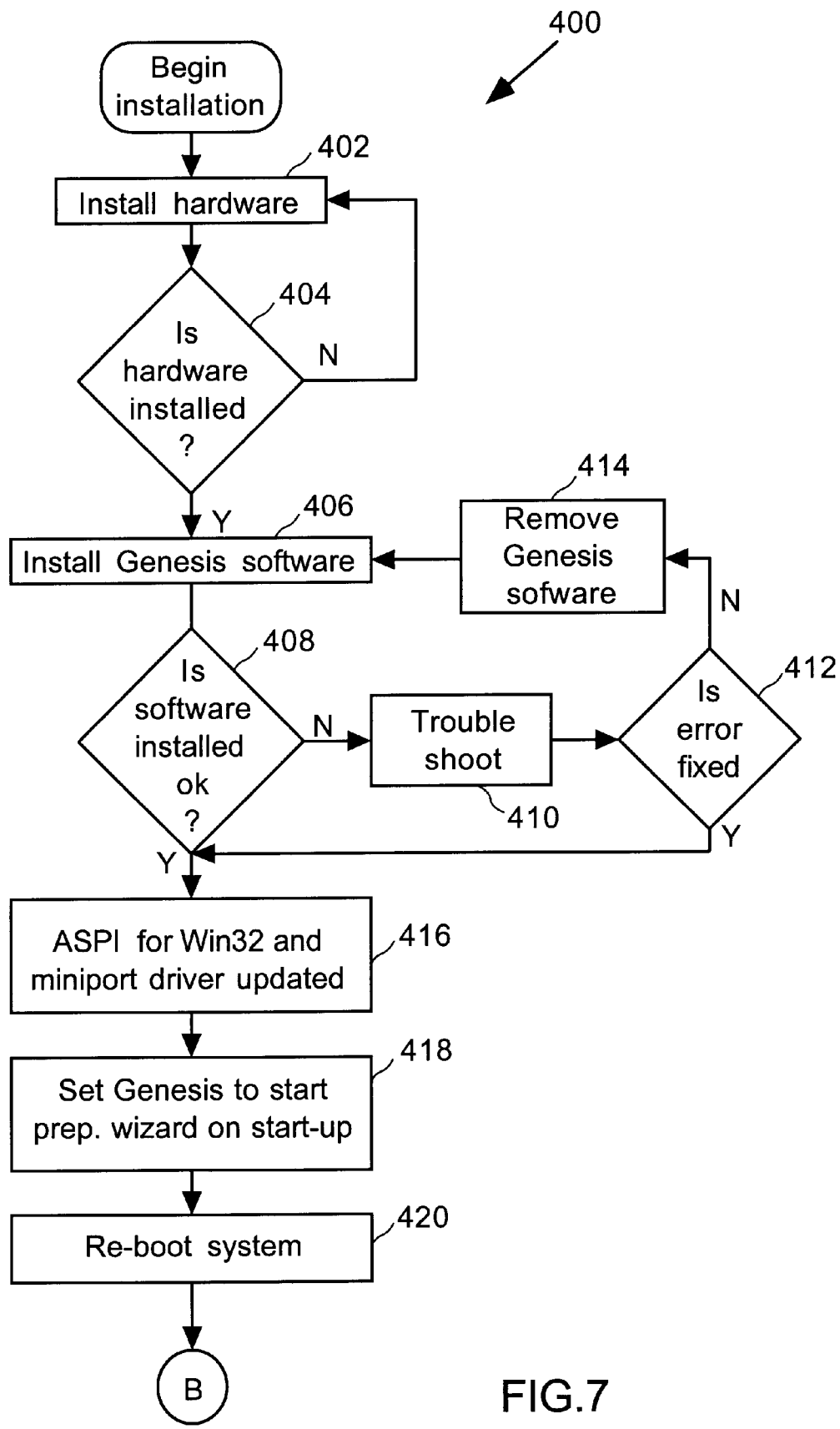
FIGS. 7 and 8 illustrate a more detailed description of the method operations performed during the installation of the Genesis hardware and software in accordance with one embodiment of the present invention.
Figure 8:
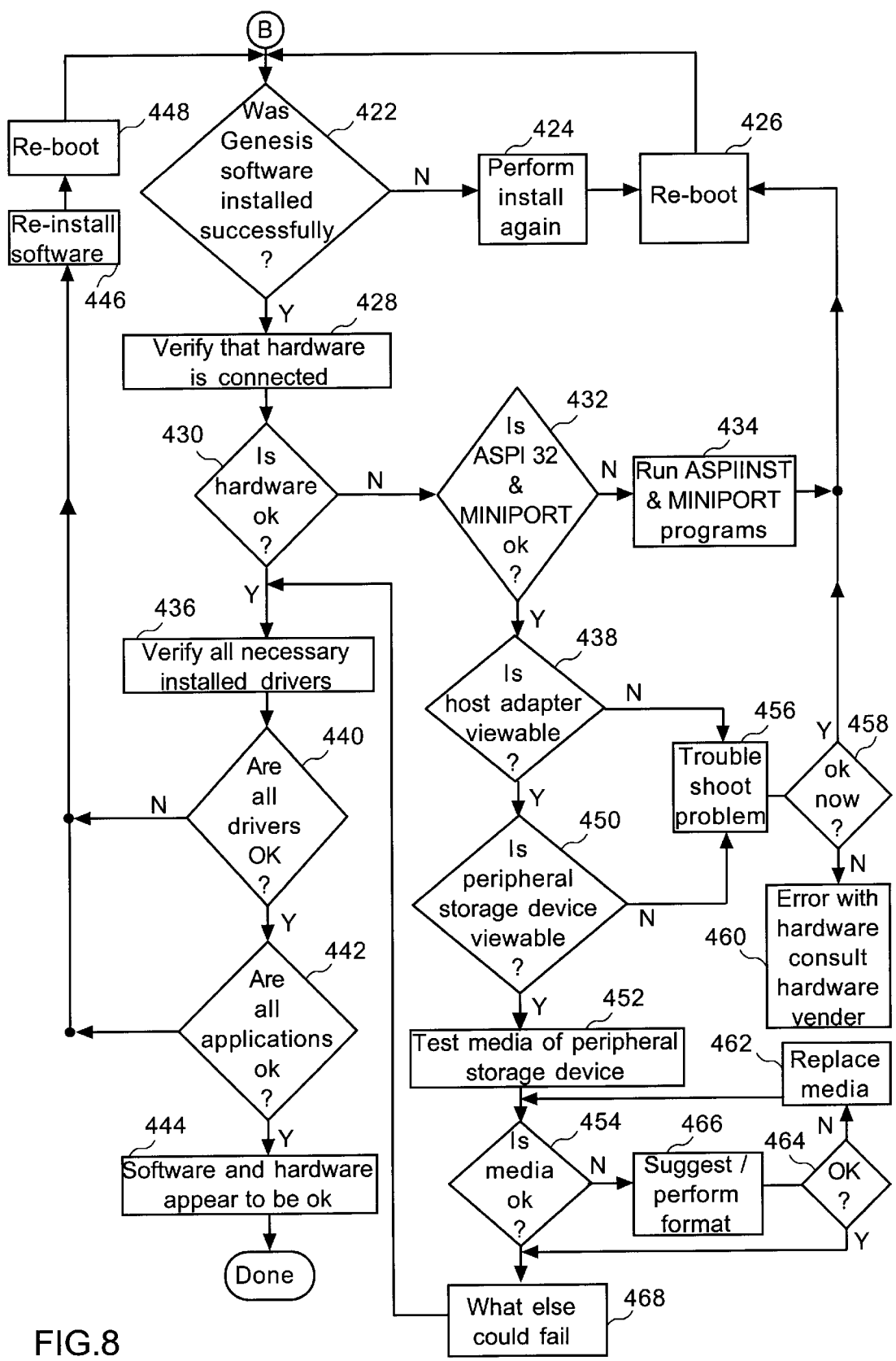

Reference is now drawn to FIG. 7 where the installation process 400 of the intelligent Genesis backup protection system is described in accordance with one embodiment of the present invention. The method begins at an operation 402 where the hardware is installed. The hardware includes a SCSI host adapter, a peripheral storage device, and a SCSI cable (or Bus) that interconnects the peripheral storage device to the SCSI host adapter. In a preferred embodiment, the SCSI host adapter is preferably an Adaptec host adapter that has a special BIOS which enables booting to a SCSI peripheral storage device even when an EIDE drive is installed in the host computer.

Once the hardware is installed in operation 402, the method proceeds to a decision operation 404. In decision operation 404, it is determined whether the hardware was installed. If it has not been installed, the method proceeds back to operation 402. On the other hand, if the hardware was installed, the method proceeds to an operation 406 where the Genesis software is installed. Upon installation, the method proceeds to an operation 408 where it is determined whether the software was installed properly. If it was not installed properly, the method proceeds to an operation 410 where trouble shooting is performed. Once trouble shooting is performed, the method proceeds to a decision operation 412 where it is determined if the error is fixed.

If the error is not fixed, the method will proceed to an operation 414 where the Genesis software is removed from the host computer system. Once the Genesis software is removed from the host computer system, the method proceeds back to the installation operation 406 where the Genesis software is re-installed. On the other hand, if it is determined that the error is fixed in operation 412, the method will proceed to an operation 416. Likewise, if it was determined in operation 408 that the software was installed properly, the method will also proceed to operation 416. In operation 416, an ASPI for Win32 and Miniport driver is updated. Once the update is performed, the method proceeds to an operation 418 where Genesis will begin the preparation wizard upon startup.

At this point, the method proceeds to an operation 420 where the system is re-booted and then proceeds to a pointer B. The method now proceeds to a decision operation 422 where it is determined if the Genesis software was installed properly. If it was not installed properly, the method will proceed to an operation 424 where the installation is performed again, and then a re-boot is performed in operation 426 before the method reverts back to operation 422. When the Genesis software determines to have been installed successfully, the method will proceed to an operation 428. In operation 428, a verification is performed to determine if the hardware is connected. Next, the method will proceed to a decision operation 430 where it is determined if the hardware is O.K. If the hardware is not O.K., the method will proceed to a decision operation 432 where it is determined if the ASPI Win32 and Miniports are O.K.

If either the ASPI Win32 or Miniport are not O.K., the method will proceed to an operation 434. In operation 434, an ASPI INST program and/or Miniport program are run. Upon running the ASPI INST and/or Miniport programs, the operation reverts back to operation 426 where the computer is re-booted. However, if it is determined in operation 432 that the ASPI Win32 and Miniports are O.K., the method will proceed to an operation 438. In operation 438, it is determined if the host adapter is viewable by the host computer system. If it is not viewable, the method proceeds to an operation 456 where the problem is trouble shooted.

Next, the method will proceed to a decision operation 458 to determine if the host adapter is now viewable. If it is viewable, the method will then proceed back to operation 426 where the computer is re-booted. On the other hand, if it is determined that the host adapter is viewable in operation 438, the method will proceed to an operation 450 where it is determined if the peripheral storage device is viewable. If the peripheral storage device is not viewable, the method will proceed back to operation 456 where the problem is trouble shooted. The method will then proceed back to decision operation 458 to determine if the problem is now O.K. If the problem is O.K., the method will return back to operation 426 where the computer is re-booted. However, if it is determined at any point at operation 458 that the problem is not O.K., the method will proceed to an operation 460 where it is determined that an error has occurred with the hardware and the user is suggested to consult a specific hardware vendor.

Returning again to decision operation 450, if it is determined that the peripheral storage device is viewable, the method will proceed to an operation 452. In operation 452, the media of the peripheral storage device is tested. The method then proceeds to a decision operation 454 where it is determined if the media is O.K. If it is not O.K., the method will proceed to an operation 466 where it is suggested that a reformat of the media be performed. At this point, the method will proceed to a decision operation 464 where it is determined if the media is now O.K. If the media is not O.K., the method will proceed to an operation 462 where the media is replaced.

However, if it is determined that the media is O.K. in operation 454, or if the media is O.K. after a reformat, the method will proceed to an operation 468 where it is determined if anything else could fail. Referring now back to decision operation 430, if it is determined that the hardware is O.K., the method will proceed to an operation 436 where a verification of all necessary install drivers is performed. Once the verification is performed in operation 436, the method proceeds to a decision operation 440. In operation 440, it is determined if all drivers are O.K. If any driver is not O.K., the method will proceed to an operation 446 where a re-install of the Genesis software is performed. Once re-installed, the method will proceed to an operation 448 where the computer is rebooted and the method proceeds back to decision operation 422.

On the other hand, if it is determined in operation 440 that all drivers are O.K., the method will proceed to a decision operation 442 where it is determined if all applications are O.K. If all applications are not O.K., the method will again proceed back up to operations 446, 448 and 422 and back down to operation 442. Once all applications are O.K., the method will proceed to an operation 444 where the software and hardware are determined to be O.K., and the installation process will be done.

Figure 9:
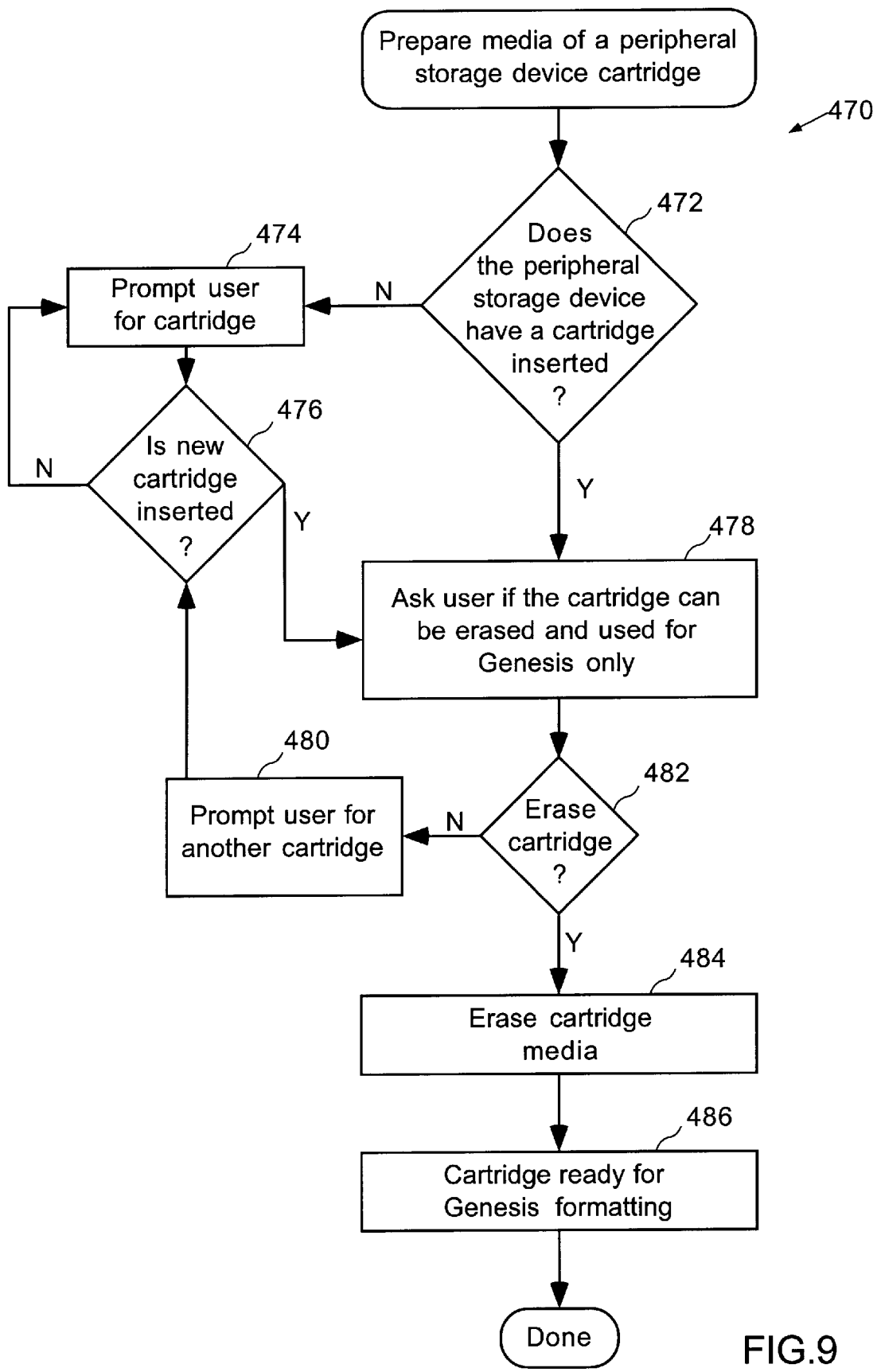
FIG. 9 shows a detailed flowchart diagram illustrating the method operations performed in preparing a media of a peripheral storage device cartridge in accordance with one embodiment of the present invention.

FIG. 9 shows a detailed flowchart diagram 470 illustrating the method operations performed in preparing a media of a peripheral storage device cartridge in accordance with one embodiment of the present invention. In this embodiment, the cartridge is preferably one that has the capability of storing a large amount of data and being inserted into a peripheral storage device, such as a Jazz drive. The method now begins at an operation 472 where it is determined whether the peripheral storage device has a cartridge inserted therein.

If the cartridge is not inserted, the preparation wizard will inform the user in operation 474 that the cartridge is not inserted and one should be placed into the peripheral storage device. The method then proceeds to a decision operation 476 where it is determined if the cartridge that was inserted into the peripheral storage device is new. If it is not new, the user will be prompted to insert a new cartridge in operation 474. Once a new cartridge is inserted, the method will proceed to a decision operation 478 where the user is asked if the cartridge media can be erased and used for Genesis purposes only. The method now proceeds to a decision operation 482 where it is determined if the cartridge can be erased.

If the cartridge cannot be erased, the method will proceed to an operation 480 where the user is prompted to insert another cartridge that may be erased. If the cartridge can be erased, the method will proceed from decision operation 482 to an operation 484. In operation 484, the cartridge media is erased. Once the cartridge media has been erased, the method will proceed to an operation 486 where the cartridge media will be ready for Genesis formatting and the method will be done. Of course, if the peripheral storage device is a second hard disk drive, there will be no need to detect whether a cartridge is inserted, and the hard disk drive media will already be in condition for Genesis formatting.

Figure 10A:
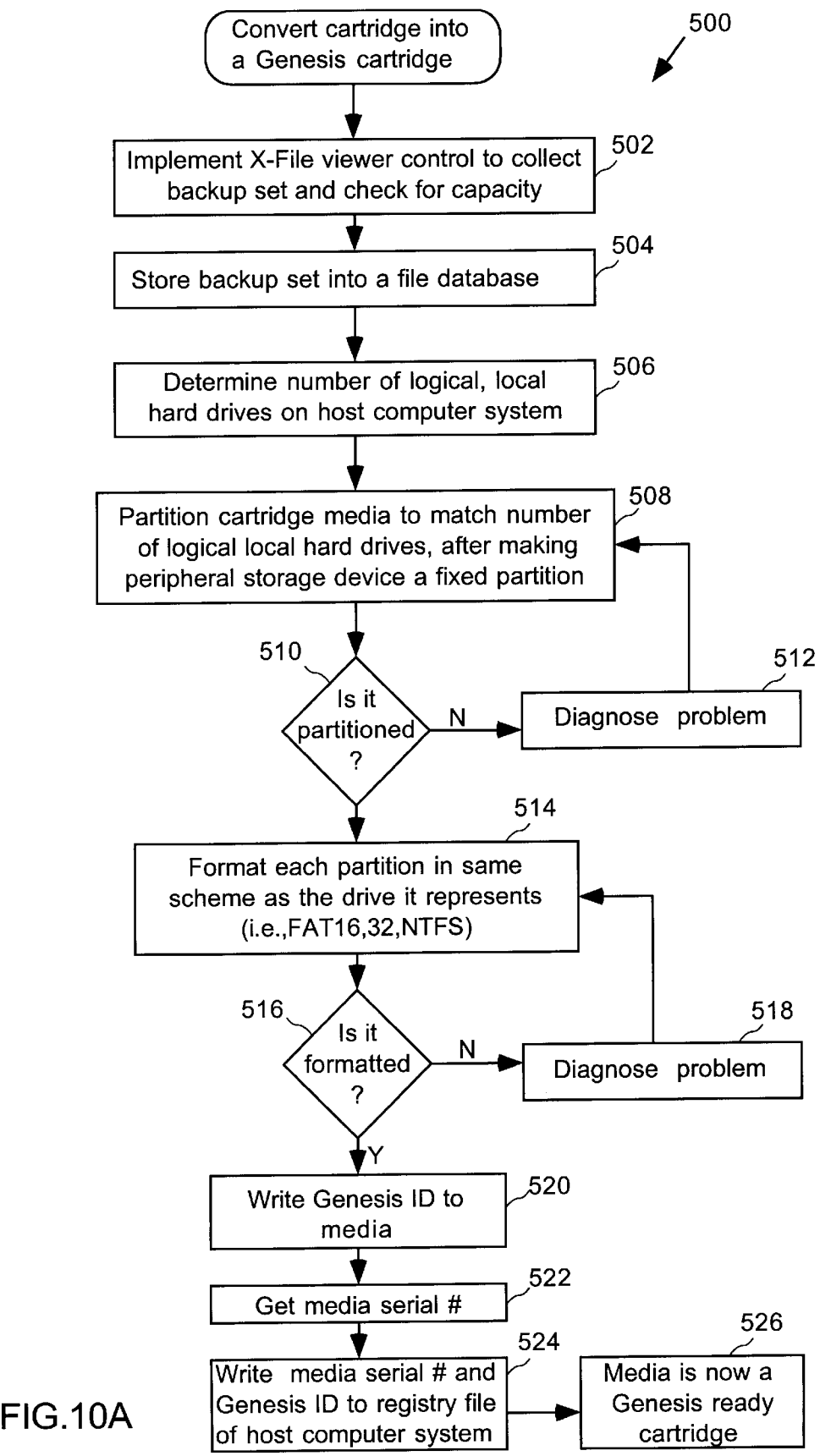
FIG. 10A illustrates the method operations performed in converting a cartridge into a Genesis enabled cartridge in accordance with one embodiment of the present invention.

FIG. 10A illustrates the method operations 500 performed in converting a cartridge into a Genesis enabled cartridge in accordance with one embodiment of the present invention. In general, when a cartridge has been converted into a Genesis cartridge, the host adapter BIOS will automatically detect that a Genesis cartridge has been inserted into the peripheral storage device, and the intelligent Genesis backup protection system will be allowed to be enabled.

The method begins at an operation 502 where the preparation wizard will allow the user to use the X-file viewer control to collect a backup set and check for capacity. As described above with reference to FIG. 5B, the X-file viewer control will allow the user to select certain programs, files and folders that will be automatically and incrementally backed up by the intelligent Genesis backup system. Of course, certain files such as boot files, and operating system files will be automatically selected by default to enable booting to the peripheral storage device if a system error occurs with the host computer system.

In one embodiment, when the media of the Genesis cartridge holds about two gigabytes of data, the capacity monitor 312 of FIG. 5B will preferably only allow the user to collect data that will fill about 80 percent of the drive (i.e., about 1.6 GB). In this manner, once the intelligent Genesis backup system is functioning, additional space will be available for saving data during routine use, adding new programs, etc. Once the X-file viewer control has been implemented to collect the backup set and check for capacity in operation 502, the method will proceed to an operation 504. In operation 504, the backup set will be stored into a file database. The file database is essentially a list of all of the programs, files and data selected by the user to be part of the backup set, and will also provide a pointer to the location in the user's host computer system hard drive.

Once the file database has been generated in operation 504, the method will proceed to an operation 506 where it is determined what the number of logical local drive partitions are present on the host computer system. Once the number of logical local drives currently present on the host computer system have been determined in operation 506, the method will proceed to an operation 508 where the cartridge media is partitioned to match the number of logical local drives on the host computer system, after making the peripheral storage device a fixed partition. Next, the method proceeds to a decision operation 510 where it is determined whether the cartridge media has been partitioned. If it has not been partitioned correctly, the method will proceed to an operation 512 where the problem is diagnosed and partitioning is performed again.

If it has been partitioned correctly, the method will proceed to an operation 514 where each partition is formatted in the same scheme as the drive it represents. For example, the formatting may be performed in FAT 16, FAT 32, and NTFS schemes. Once each partition has been formatted in operation 514, the method proceeds to a decision operation 516 where it is determined if each partition has been formatted. If each partition has not been formatted correctly, the method will proceed to an operation 518 where the problem is diagnosed and formatting is performed again in operation 514. Once it is determined in operation 516 that the drive has been formatted, the method will proceed to an operation 520 where a Genesis ID signature is written to the media. After the Genesis ID is been written to the media in operation 520, the media serial number is retrieved by the preparation wizard of the Genesis software.

At this point, the media serial number that was retrieved and the Genesis ID are written to the registry file of the host computer system. In this manner, when a cartridge having the Genesis signature ID and the media serial number is inserted into the peripheral storage device, the computer system will know that the intelligent Genesis backup protection system is ready for use. Next, the method will proceed to an operation 526 where the media is now a Genesis-ready cartridge. Of course, any number of cartridges may be formatted in the same way as described with reference to method 500.

FIGS. 10B through 10E illustrate the partitioning performed on the peripheral storage device media when one or more logical local drives are present on the host computer system in accordance with one embodiment of the present invention. For example, FIG. 10B shows an exemplary host computer system A having logical partitions A:, B:, C:, and D:. In this example, partition A: is for a floppy drive, partition B: is for a hard drive, partition C: is for a CD ROM drive, and partition D: is for a peripheral storage device which may be used for the intelligent Genesis backup protection system. Thus, when only one logical local drive is present on the host computer system A, the peripheral storage device media has one partitioned and matches that of the host computer system A as shown in FIG. 10C.

FIG. 10D illustrates an example of when a host computer system B has more than one logical local drive partition. In this case, the partitioning of the peripheral storage device media, which is given a fixed logical drive letter F: in the host computer system B, is partitioned into three separate partitions as shown in FIG. 10E. In this example, logical partitions B: and C: are associated with a physical hard disk 527 and logical partition D: is associated with a physical hard disk 528. The resulting partitions in the peripheral storage device will be partitions 527a, 527b, and 528. In addition, each partition within the peripheral storage device media is sized such that a percentage of the partition is unused to enable the user to normally use the peripheral storage device media after the host computer system has experienced a failure.

Figure 11A:
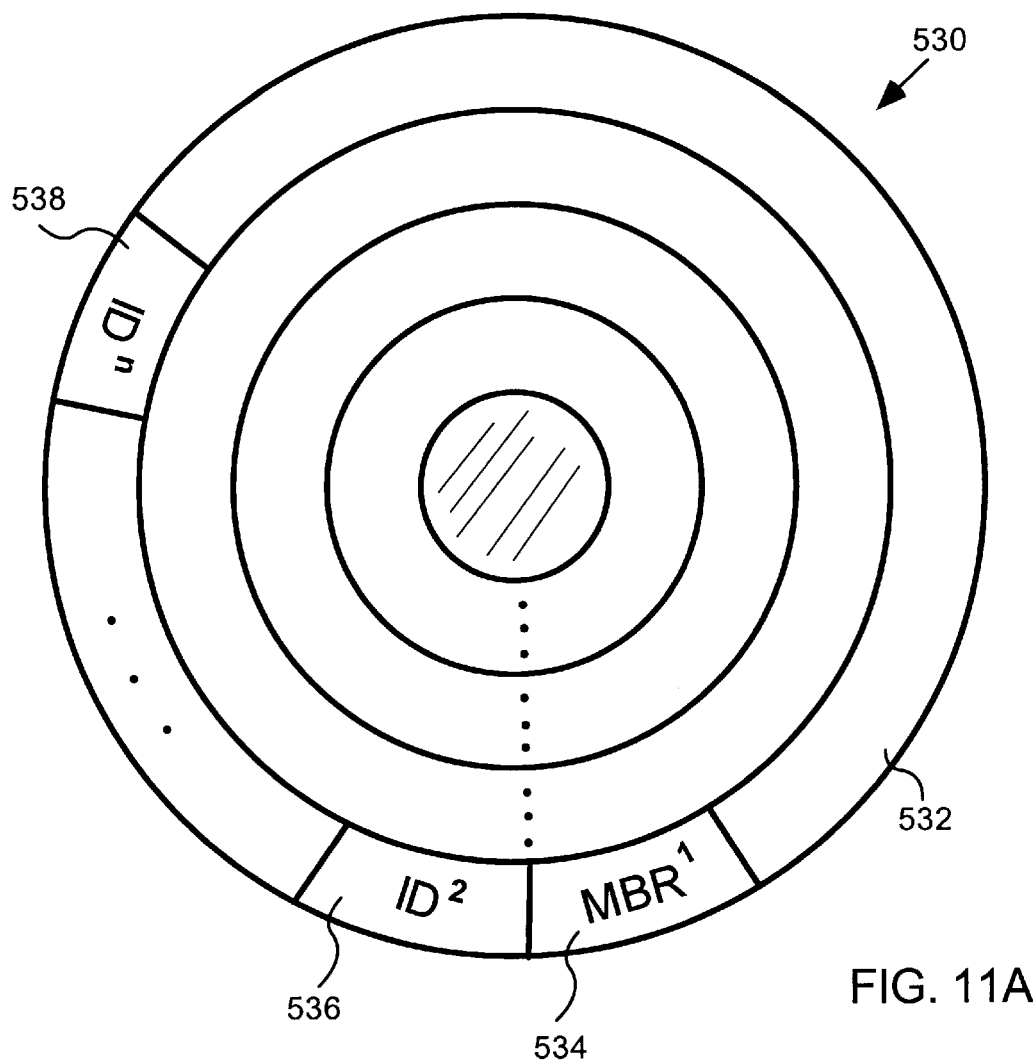
FIG. 11A shows a top view of a first selected track and selected sectors of a peripheral storage device media in accordance with one embodiment of the present invention.
Figure 11B:
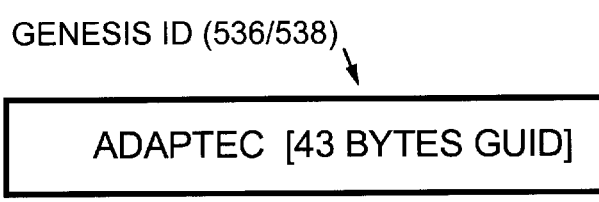
FIGS. 11B–11C show the format of a Genesis ID that is written to one or more sectors of the peripheral storage device media and the data that is written to the system's registry file in accordance with one embodiment of the present invention.

FIG. 11A shows a top view of a peripheral storage device media (cartridge media or hard disk media) 530 in accordance with one embodiment of the present invention. In this example, a first track 532 is shown having a master boot record (MBR) in a first sector 534, and a Genesis ID 536 in a second sector following the MBR sector 534. For redundancy purposes, a second (or more) Genesis ID is written in another sector 538 along the same first track 532. FIG. 11B shows an exemplary Genesis ID signature 536 which will preferably include the designation of Adaptec followed by 43 bytes of a global unique identifier (GUID).

Figure 11C:
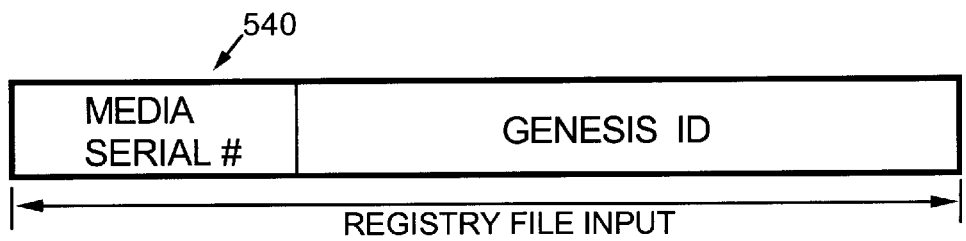

After the Genesis IDs 536/538 have been written onto the peripheral storage device media 530 in the first track 532, the preparation wizard of the intelligent Genesis backup protection system will obtain a unique serial number for the peripheral storage device media 530, which is typically located in the media's Z-sector. As shown in FIG. 11C, the media serial number 540 that was retrieved from the Z-sector of the peripheral storage device media 530 will be combined with the Genesis ID to define a single registry file input. In this manner, each time a new peripheral storage device media is prepared to be a Genesis-enabled media, its unique media serial number and the Genesis ID will be placed into the host computer's system registry file and peripheral storage device media. Thus, any time the peripheral storage device media that has been formatted to be a Genesis-enabled media is inserted into a peripheral storage device, the intelligent Genesis backup protection system will be ready to be enabled.

Figure 12:
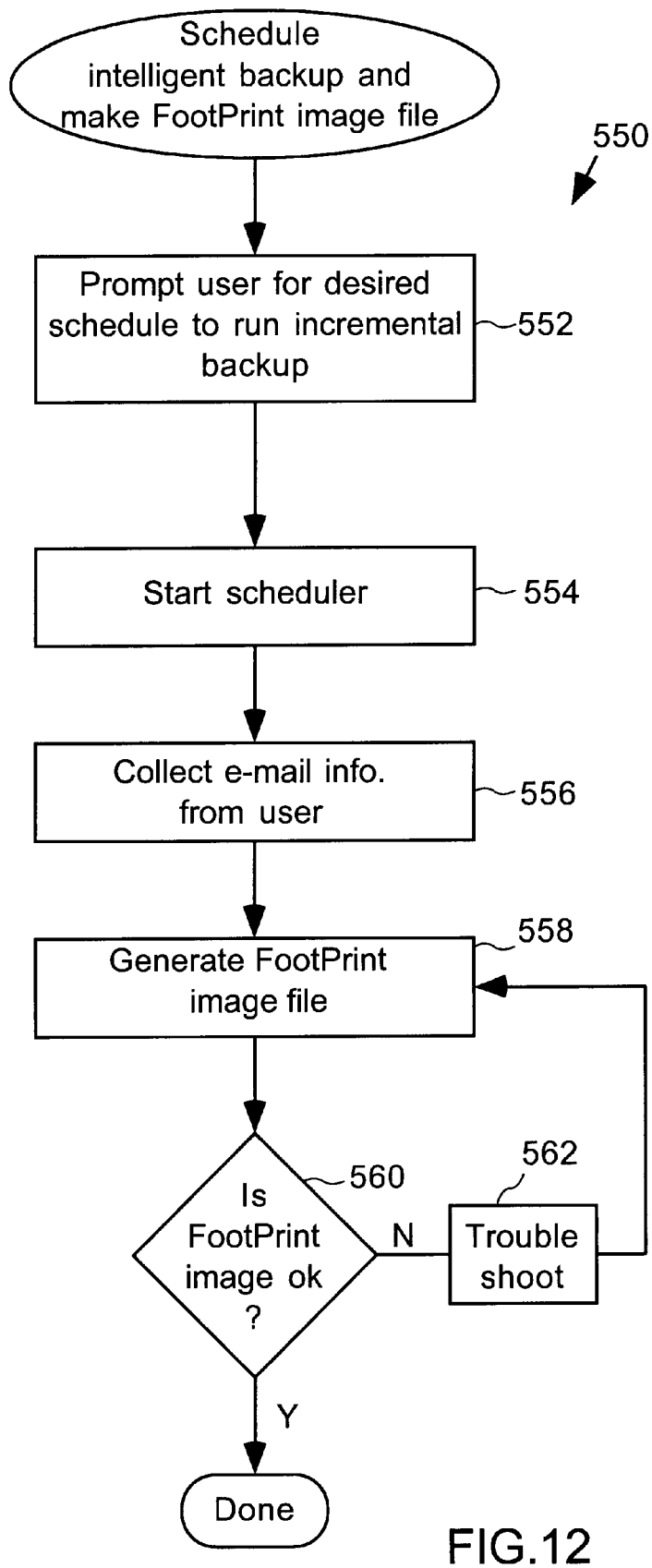
FIG. 12 shows a flowchart diagram illustrating the method operations performed in scheduling the intelligent backup and making a footprint snapshot in accordance with one embodiment of the present invention.

FIG. 12 shows a flowchart diagram 550 illustrating the method operations for scheduling the intelligent backup and making a footprint snapshot in accordance with one embodiment of the present invention. The method begins at an operation 552 where the user is prompted to input a desired schedule to run the incremental backup operations. Once the user has input the desired scheduling, the method will proceed to an operation 554 where the scheduler is started. Once the scheduler has been started, the method proceeds to an operation 556 where an E-mail address of computer support personnel is collected from the user. As mentioned above, this E-mail address is used by the intelligent Genesis backup system to notify the appropriate computer support personnel that the user has experienced a system failure.

Next, the method proceeds to an operation 558 where a footprint snapshot of the host computer system's data is taken as described above. Once the footprint snapshot has been taken of the computer system's data, the method will proceed to a decision operation 560 where it is determined if the footprint image is O.K. If the image is not O.K., the method will proceed to an operation 562 where trouble shooting is performed and then the footprint snapshot is taken again in operation 558. Once it is determined that the footprint image is O.K., the method will be done for scheduling the intelligent backup and making a footprint snapshot.

Figure 13:
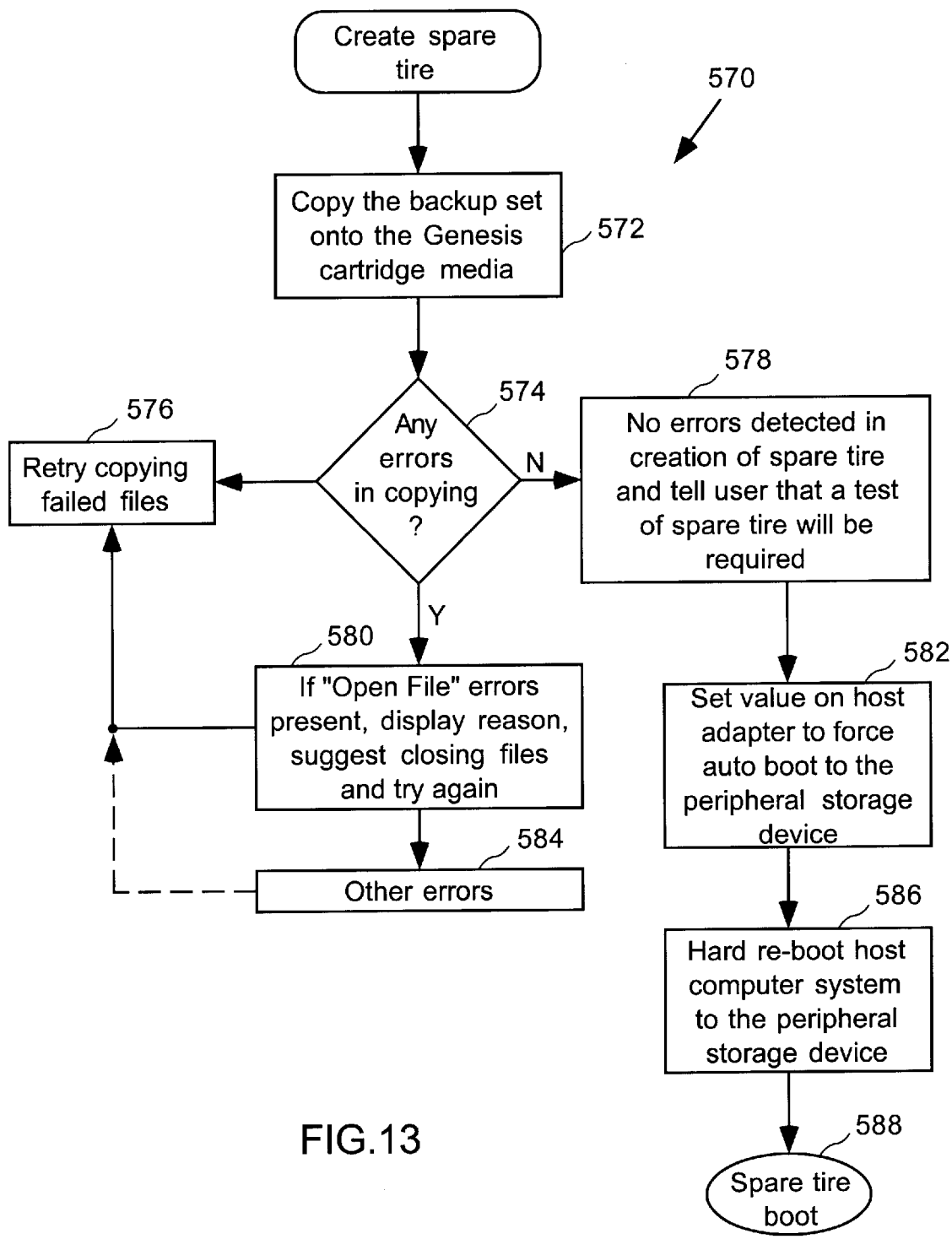
FIG. 13 shows a flowchart diagram detailing the method operations performed in creating a SpareTire in accordance with one embodiment of the present invention.

FIG. 13 shows a flowchart diagram 570 detailing the method operations performed in creating a SpareTire in accordance with one embodiment of the present invention. The method begins at an operation 572 where the backup set selected by the user (including the default backup set), is copied from the host computer system's logical hard drives and onto the Genesis cartridge media that has been previously partitioned to match the logical local drives of the host computer system. Once the backup set has been copied onto the Genesis cartridge media in operation 572, the method will proceed to an operation 574. In operation 574, it is determined if there were any errors in performing the copying. If errors are detected during the copying, the method will proceed to an operation 580. In operation 580, if errors occurred due to "open files", the user will be displayed the reason for such errors and then prompted to close the files and retry the copying once again. At that point, the method will proceed to an operation 576 where a copying operation will again be performed in order to copy the failed files. If the problem in copying was not due to open files, the method will proceed to an operation 584 where other errors may be detected and displayed to the user.

After the user has corrected such problems, the method will again proceed to operation 576 where the copying is again re-tried for those failed files. Once there are no errors in the copying operation, the method will proceed to an operation 578 where the user is informed that a test of the SpareTire will be required. Next, the method will proceed to an operation 582 where a value is set on the host adapter to force an automatic boot to the peripheral storage device. As mentioned above, the host adapter is preferably an Adaptec host adapter or one capable of processing a special Adaptec BIOS which allows the peripheral storage device to be the boot device, even when an EIDE device is connected to the computer system. Next, the method will proceed to an operation 586 where a hard reboot of the host computer system is performed to the peripheral storage device. At that point, the SpareTire will be booted at operation 588, and the creation of the SpareTire will be complete.

Figure 14:
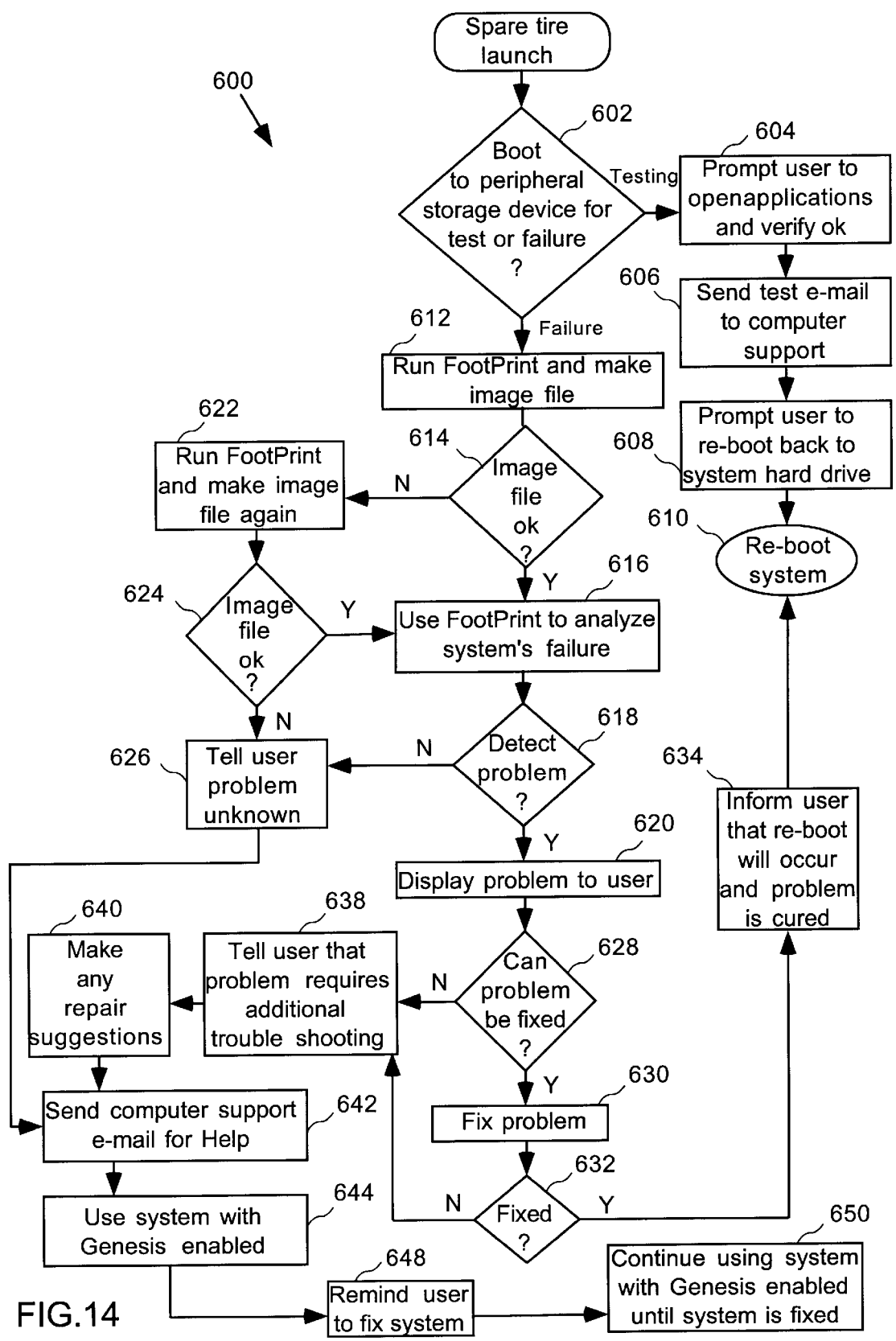
FIG. 14 shows a detailed flowchart diagram illustrating the method operations performed in launching the SpareTire software in accordance with one embodiment of the present invention.

FIG. 14 shows a detailed flowchart diagram 600 illustrating the method operations performed in launching the SpareTire software in accordance with one embodiment of the present invention. The method begins at an operation 602 where it is determined whether booting to the peripheral storage device is performed for test purposes or in the case of a system failure. If booting to the peripheral storage device is performed for testing purposes, the method will proceed to an operation 604 where the user is prompted to open applications and verify that they have been successfully copied to the peripheral storage device media in the order that they should have appeared if the user was working from the host computer system's hard drive.

The method will then proceed to an operation 606 where a test E-mail message is sent to the appropriate computer support personnel. Once the E-mail test has been performed, the method will proceed to an operation 608 where the user is prompted to re-boot back to the system hard drive and then the method will end at operation 610 where the system is re-booted.

On the other hand, in operation 602, the booting to the peripheral storage device may occur because a failure has occurred with the host computer system. In one embodiment, if the user desires to boot from the peripheral storage device, the user will be instructed by the Adaptec BIOS to press "<CTRL><J>". At that point, the method will proceed to an operation 612 where a footprint will be run in order to make an image of the host computer system files after the failure has occurred (i.e., the after image).

The method will then proceed to an operation 614 where it is determined if the image file is O.K. If the image file is not O.K., the method will proceed to an operation 622 where the footprint engine will be run in order to make another image file after the system failure has occurred. At this point, the method will proceed to a decision operation 624 where it is again determined if the image file is O.K. If it is not O.K., the method will proceed to an operation 626 where the user is informed that the problem is unknown. On the other hand, if it is determined that the image file is O.K. in operations 624 or 614, the method will proceed to an operation 616. In operation 616, the footprint image is used in order to determine what the system failure was. Next, the method will proceed to operation 618 where it is determined if the problem can be detected. If the problem cannot be detected, the method will proceed to an operation 626 where the user is informed that the problem is unknown.

From operation 626, the method will proceed to an operation 642 where the computer support personnel is sent an E-mail indicating that a system failure has occurred and the problem is unknown. However, if it is determined in operation 618 that the problem can be detected, the method will proceed to an operation 620 where the problem is displayed to the user. The method then proceeds to a decision operation 628 where it is determined whether the problem can be fixed. If the problem cannot be fixed, the method will proceed to an operation 638 where the user is informed that the problem requires additional trouble shooting.

However, if the problem can be fixed, the method will proceed from operation 628 to operation 630 where the problem is fixed. The method now proceeds to a decision operation 632 where it is determined if the problem has been fixed. If it has not been fixed, the method will also proceed to operation 638 where the user is informed that the problem requires additional trouble shooting. However, if it is determined in operation 632 that the problem was fixed, the method will proceed to an operation 634 where the user is informed that a re-boot will occur and the problem will be cured. At that point, the method will proceed to operation 610 where the system is re-booted and normal operation can continue from the host computer system's hard drive.

If the user is informed that the problem requires additional trouble shooting in operation 638, the method will proceed to an operation 640 where any suggested repair is can be performed. From here, the method will proceed to operation 642 where the computer support personnel is sent an E-mail notifying them that a failure has occurred with the host computer system, and provides information regarding the possible system failures. At that point, the method will proceed to an operation 644 where the system can continue to be used from the Genesis-enabled peripheral storage device. In this manner, the user's productivity will not suffer while any repairs are being performed to the computer system's hard drive.

While the user is using the computer system with Genesis-enabled, the method will proceed to an operation 648 where the user is reminded to fix the problem. The method now proceeds to an operation 650 where the user may continue using the system with Genesis-enabled until the system is fixed, and the method 600 of the SpareTire launch will be complete.

Figure 15:
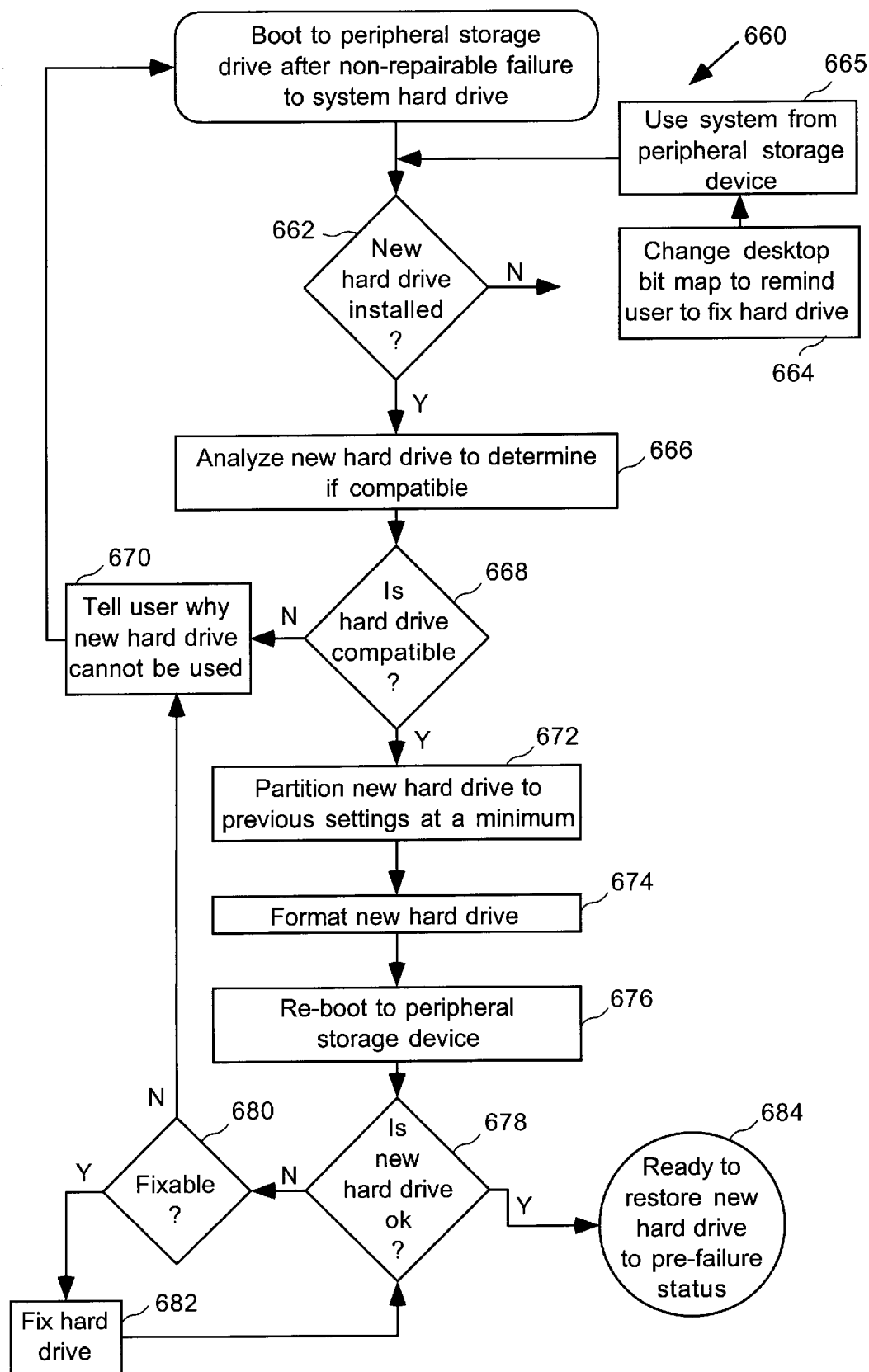
FIG. 15 shows a flowchart diagram illustrating the method operations performed in booting to the peripheral storage device after a non-repairable failure has occurred to the host computer system's hard drive in accordance with one embodiment of the present invention.

FIG. 15 shows a flowchart diagram 660 illustrating the method operations performed in booting to the peripheral storage device after a non-repairable failure has occurred to the host computer system's hard drive. The method begins at a decision operation 662 where it is determined if a new hard drive has been installed. If a new hard drive has not been installed, the method will proceed to an operation 664 where the desktop bitmap is changed to remind the user that the system's hard drive should be repaired. This essentially provides the user a warning that the intelligent Genesis backup protection system is only a temporary fix which should be remedied by fixing the host computer system's hard drive. The method now proceeds to an operation 665 where the system is used from the peripheral storage device, and the method will revert to operation 662.

When a new hard drive has been installed, the method will proceed to an operation 666 where it is determined if the new hard drive is compatible with the host computer system. If it is determined in operation 668 that the new hard drive is not compatible, the user will be informed that a compatible hard drive needs to be installed in operation 670. When a new hard drive that is compatible is installed, the method will proceed to an operation 672 where the new hard drive is partitioned to match the settings that existed in the host computer's hard drive previous to the system failure. Next, the method will proceed to an operation 674 where the new hard drive is formatted. After formatting, the method proceeds to an operation 676 where a re-boot to the peripheral storage device is performed. At this point, it is determined in operation 678 whether the new hard drive is O.K. If it is not O.K., the method will proceed to an operation 680 where it is determined if the new hard drive can be fixed.

If it can be fixed, the method will proceed to an operation 682 where the hard drive is fixed. On the other hand, if it cannot be fixed, the method will proceed to an operation 670 where the user is informed that the new hard drive cannot be used and another needs to be installed. If the new hard drive is determined to be O.K. in operation 678, the method will proceed to operation 684 where the user is informed that the new hard drive is ready to be restored to its pre-failure status. Of course, if the user added or modified programs or files when working off of the Genesis media, those changes will also be copied to the new hard drive(s).

Figure 16:
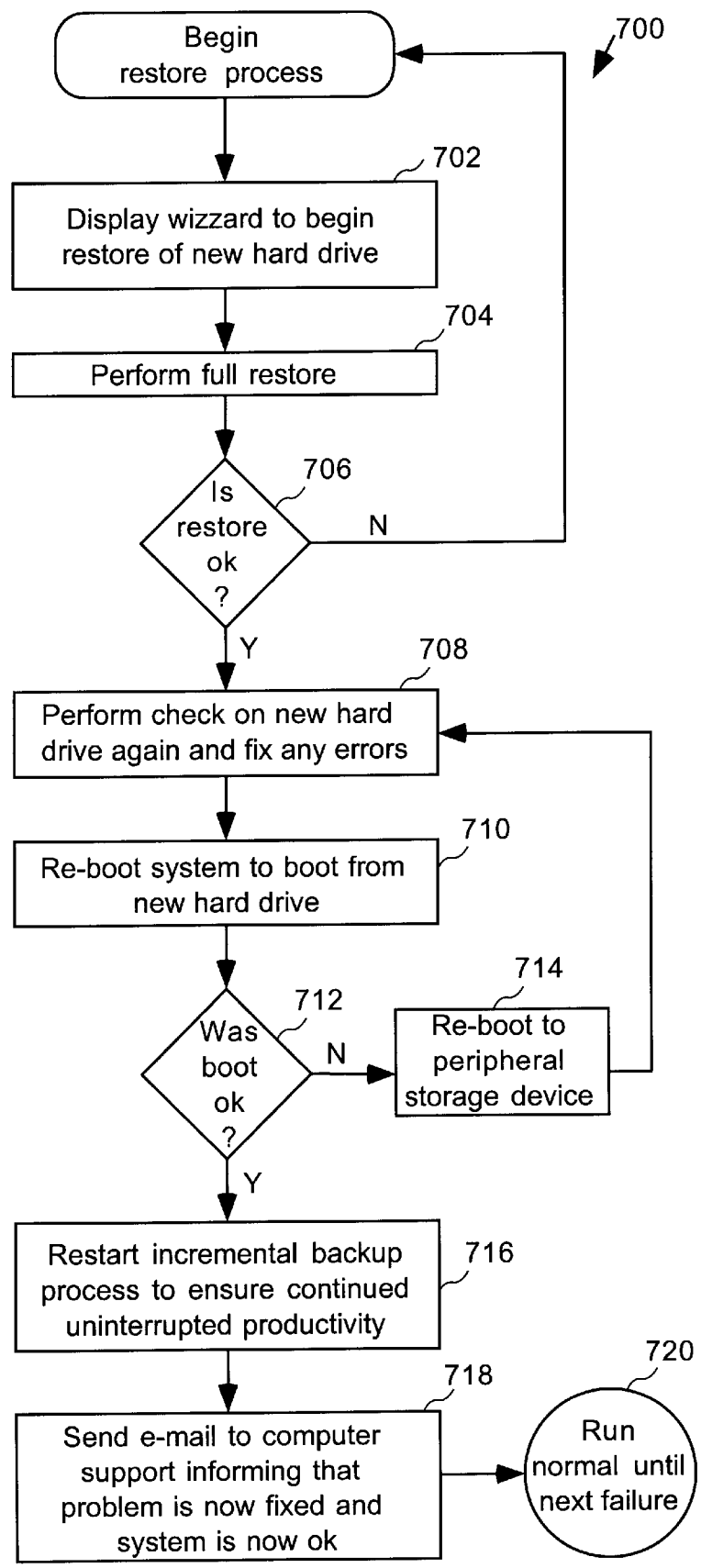
FIG. 16 shows a flowchart diagram illustrating the method operations performed during a restore process in accordance with one embodiment of the present invention.

FIG. 16 shows a flowchart diagram 700 illustrating the method operations performed during a restore process in accordance with one embodiment of the present invention. The restore process begins at an operation 702 where the SpareTire wizard, such as that shown in FIG. 6B above, is displayed to the user to enable restoration of the new or repaired hard drive(s). Specifically, as shown in frame 360', the user is provided with an option to select the "perform-restore" link 361 which launches the full restoration of the new hard drive which is performed in operation 704. The method now proceeds to a decision operation 706 where it is determined whether the restoration was performed satisfactorily. If it was not performed to a satisfactory condition, the method will proceed back to the beginning of the restoration process.

On the other hand, if the restoration was determined to be O.K. in operation 706, the method will proceed to an operation 708 where a check is performed on the new hard drive and any errors are fixed. The method now proceeds to an operation 710 where the system is booted from the new hard drive. Now, the method proceeds to a decision operation 712 where it is determined whether the booting was performed O.K. If it was not performed O.K., the method proceeds to an operation 714 where a re-boot to the peripheral storage device is performed and the method proceeds back to operation 708. If the booting to the restored hard drive is O.K., the method will proceed from operation 712 to operation 716 where the incremental backup process is restarted to ensure continued uninterrupted productivity in case of another failure occurs to the new hard drive(s).

The method then proceeds to an operation 718 where an E-mail to the computer support personnel is sent informing them that the problem has now been fixed and the system is now running O.K. Now, the method proceeds to an operation 720 where the user may run off of the new restored hard drive(s) until another failure occurs and re-booting to the peripheral storage device is again required.

The invention may employ various computer-implemented operations involving data stored in computer systems to drive computer software, including application programs, operating system programs, peripheral device drivers, etc. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 17:
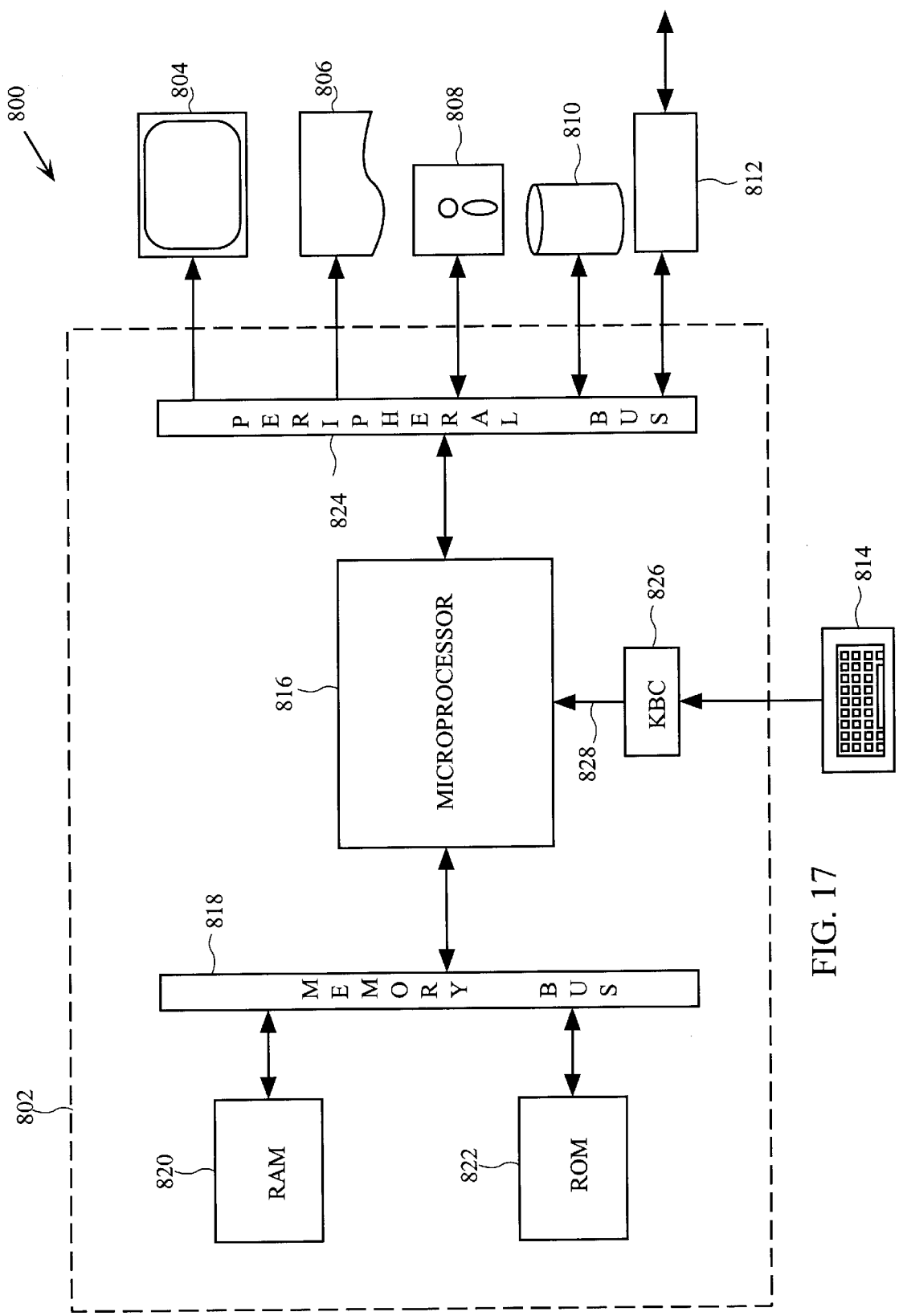
FIG. 17 is a block diagram of an exemplary computer system for carrying out at least part of processing according to the invention.

FIG. 17 is a block diagram of an exemplary computer system 800 for carrying out the processing according to the invention. The computer system 800 includes a digital computer 802, a display screen (or monitor) 804, a printer 806, a floppy disk drive 808, a hard disk drive 810, a network interface 812, and a keyboard 814. The digital computer 802 includes a microprocessor 816, a memory bus 818, random access memory (RAM) 820, read only memory (ROM) 822, a peripheral bus 824, and a keyboard controller 826. The digital computer 800 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 816 is a general purpose digital processor which controls the operation of the computer system 800. The microprocessor 816 can be a single-chip processor or can be implemented with multiple components. Using instructions retrieved from memory, the microprocessor 816 controls the reception and manipulation of input data and the output and display of data on output devices. According to the invention, a particular function of microprocessor 816 is to assist in execution and rendering of the software operations of the intelligent Genesis backup protection system.

The memory bus 818 is used by the microprocessor 816 to access the RAM 820 and the ROM 822. The RAM 820 is used by the microprocessor 816 as a general storage area and as scratch-pad memory, and can also be used to store input data and processed data. The ROM 822 can be used to store instructions or program code followed by the microprocessor 816 as well as other data.

The peripheral bus 824 is used to access the input, output, and storage devices used by the digital computer 802. In the described embodiment, these devices include the display screen 804, the printer device 806, the floppy disk drive 808, the hard disk drive 810, and the network interface 812. The keyboard controller 826 is used to receive input from keyboard 814 and send decoded symbols for each pressed key to microprocessor 816 over bus 828.

The display screen 804 is an output device that displays images of data provided by the microprocessor 816 via the peripheral bus 824 or provided by other components in the computer system 800. The printer device 806 when operating as a printer provides an image on a sheet of paper or a similar surface. Other output devices such as a plotter, typesetter, etc. can be used in place of, or in addition to, the printer device 806.

The floppy disk drive 808 and the hard disk drive 810 can be used to store various types of data. The floppy disk drive 808 facilitates transporting such data to other computer systems, and hard disk drive 810 permits fast access to large amounts of stored data.

The microprocessor 816 together with an operating system operate to execute computer code and produce and use data. The computer code and data may reside on the RAM 820, the ROM 822, or the hard disk drive 810. The computer code and data could also reside on a removable program medium and loaded or installed onto the computer system 800 when needed. Removable program mediums include, for example, CD-ROM, PC-CARD, floppy disk and magnetic tape.

The network interface 812 is used to send and receive data over a network connected to other computer systems. An interface card or similar device and appropriate software implemented by the microprocessor 816 can be used to connect the computer system 800 to an existing network and transfer data according to standard protocols.

The keyboard 814 is used by a user to input commands and other instructions to the computer system 800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. For example, although a preferred type of peripheral storage device is a Jaz™ drive, any type of peripheral storage devices or computer built-in storage devices can be used. In addition, the storage devices can either be physically located next to the computer system itself, or be remotely networked either over a local area network (LAN) or over the Internet.

In some embodiments, exemplary peripheral-type storage devices may include an extra hard drive(s), a digital video disk (DVD) drive, a CDRW drive, a CDR drive, a Magneto Optical Disk drive, etc. Furthermore, any type of host adapter can be used, whether it is integrated into a computer's mother board or is integrated onto a host adapter card. Accordingly, the present embodiments are to be considered as illustrative and not restrictive, and the invention is not to be limited to the details given herein, but may be modified within the scope and equivalents of the appended claims.

What is claimed is:

1. A method for protecting data of a computer system, comprising:

connecting a peripheral storage device to the computer system;

preparing a storage media of the peripheral storage device to be a protection enabled media, the preparing including, writing one or more identification codes onto a first track of the storage media following a master boot record sector;

obtaining a serial number of the storage media; and writing the one or more identification codes along with the obtained serial number into a registry file of the computer system;

selecting a backup set of data stored in a hard drive of the computer system, the backup set of data including a default set of boot files and operating system files;

creating a spare tire by copying the backup set of data from the hard drive of the computer system to the storage media of the peripheral storage device using a file-based copying scheme;

enabling the peripheral storage device to incrementally copy portions of the backup set of data from the hard drive of the computer system during normal use after creating the spare tire;

determining whether a failure occurs with the hard drive that disables booting to the hard drive; and booting the computer system from the peripheral storage device using the spare tire.

2. A method for protecting data of a computer system as recited in claim 1, wherein the preparing of the storage media of the peripheral storage device to be a protection enabled media further comprises:

re-formatting the storage media of the peripheral storage device;

partitioning the re-formatted storage media to one or more logical local partitions to match a partitioning scheme of the hard drive of the computer system; and formatting each of the logical local partitions to match a formatting scheme of the hard drive of the computer system.

3. A method for protecting data of a computer system as recited in claim 1, wherein the selecting of the backup set of data further comprises:

examining the hard drive of the computer system to identify programs and files that are stored on the hard drive, the programs and files being in addition to the default set of boot files and operating system files;

generating a user interface displaying the default set of boot files, operating system files, and the identified programs and files that are stored on the hard drive; and selecting all of the identified programs and files if the storage media is sufficiently larger than a size of the default set of boot files, operating system files, and the identified programs and files that are stored on the hard drive of the computer system, otherwise only selecting certain ones of the identified programs and files that are stored on the hard drive.

4. A method for protecting data of a computer system as recited in claim 3, wherein the selecting of the backup set of data further comprises:

generating a database file of the backup set of data, the database file being a pointer list identifying a location of each of the default set of boot files, operating system files, and selected programs and files stored on the hard drive of the computer system.

5. A method for protecting data of a computer system as recited in claim 1, further comprising:

scheduling when to incrementally copy portions of the backup set of data.

6. A method for protecting data of a computer system as recited in claim 5, further comprising:

collecting an e-mail address of a computer support personnel, and sending an automatic e-mail message to the computer support personnel at the e-mail address after the failure occurs with the hard drive that disables booting to the hard drive.

7. A method for protecting data of a computer system as recited in claim 5, further comprising:

taking a footprint image of data stored on the hard drive of the computer system, the footprint image containing a list of operating system data, a list of peripheral device data, a list of controller card data, and a time stamp of when the footprint image was created.

8. A method for protecting data of a computer system as recited in claim 7, wherein the footprint image is written to a file in text format each time a successful boot to the hard drive of the computer system occurs.

9. A method for protecting data of a computer system as recited in claim 8, further comprising:

generating an after footprint image after the failure occurs with the hard drive that disabled booting to the hard drive;

comparing the after footprint image and the footprint image that is created each time the successful boot to the hard drive of the computer system occurs; and generating information about a possible cause of the failure that disabled booting to the hard drive of the computer system.

10. A method for protecting data of a computer system as recited in claim 1, further comprising:

launching the spare tire;

determining whether booting to the peripheral storage device is desired to continue working in an uninterrupted state.

11. A method for protecting data of a computer system as recited in claim 10, further comprising:

suggesting a possible fix to the failure that disabled booting to the hard drive of the computer system; and launching a repair suite to fix the failure.

12. A method for protecting data of a computer system as recited in claim 1, further comprising:

repairing the failure of the hard drive; and restoring the hard drive of the computer system with the contents of the storage media of the peripheral storage device.

13. A system for protecting a user's productivity upon detecting a failure with a storage media of the user's computer system, the computer system having a peripheral storage device connected thereto, the system comprising;

a removable storage media that is configured to be placed into the peripheral storage device, the removable storage media being formatted to be a protection enabled media and containing a backup set of data including a default set of boot files and operating system files, the backup set of data being substantially continuously backed up on a schedule;

a spare tire launcher configured to be launched when the failure with the storage media of the user's computer system occurs to enable the user to re-boot to the peripheral storage device which contains a selected duplicate image of contents of the storage media of the user's computer system;

a preparation engine, the preparation engine being configured to perform the operations that comprise:

re-formatting the removable storage media of the peripheral storage device;

partitioning the re-formatted removable storage media to one or more logical local partitions to match a partitioning scheme of the storage media of the user's computer system;

formatting each of the logical local partitions to match a formatting scheme of the storage media of the user's computer system;

writing one or more identification codes onto a first track of the removable storage media following a master boot record sector;

obtaining a serial number of the removable storage media; and writing the one or more identification codes along with the obtained serial number into a registry file of the user's computer system.

14. A system for protecting a user's productivity upon detecting a failure with a storage media of the user's computer system as recited in claim 13, wherein the system for protecting a user's productivity further comprises a foot print engine, the foot print engine being configured to perform the operations that comprise:

taking a footprint image of data stored on the storage device of the user's computer system, the footprint image containing a list of operating system data, a list of peripheral device data, a list of controller card data, and a time stamp of when the footprint image was created.

15. A system for protecting a user's productivity upon detecting a failure with a storage media of the user's computer system as recited in claim 14, wherein the footprint image is written to a file in text format each time a successful boot to the storage device of the user's computer system occurs.

16. A system for protecting a user's productivity upon detecting a failure with a storage media of the user's computer system as recited in claim 15, wherein the foot print engine is further configured to perform the operations that comprise:

generating an after footprint image when the failure occurs with the storage media that disables booting to the storage media;

comparing the after footprint image and the footprint image that is created each time the successful boot to the storage media of the user's computer system occurs; and generating information about a possible cause of the failure that disabled booting to the storage media of the user's computer system.

17. A system for protecting a user's productivity upon detecting a failure with storage media of the user's computer system as recited in claim 13, wherein the backup set of data is copied from the storage media of the user's computer system to the removable storage media using a file-based copying scheme.

18. A computer readable media containing program instructions for protecting data of a computer system that has a peripheral storage device connected thereto, the computer readable media comprising:
   program instructions for causing preparation of a storage media of the peripheral storage device to be a protection enabled media, the preparation including writing one or more identification codes onto a first track of the storage media following a master boot record sector, obtaining a serial number of the storage media, and writing the one or more identification codes along with the obtained serial number into a registry file of the computer system;
   program instructions for enabling a selection of a backup set of data stored in a hard drive of the computer system, the backup set of data includes a default set of boot files and operating system files;
   program instructions for enabling a generation of a spare tire backup that includes the backup set of data to the storage media of the peripheral storage device;
   program instructions for enabling the peripheral storage device to incrementally copy portions of the backup set of data from the hard drive of the computer system during normal use; and
   program instructions that enable booting the computer system from the peripheral storage device when a failure occurs with the hard drive that disables booting to the hard drive.

19. A computer readable media as recited in claim 18, wherein the program instructions for preparing the storage media of the peripheral storage device to be a protection enabled media further comprises:
   program instructions for enabling of a re-formatting the storage media of the peripheral storage device;
   program instructions for enabling a partitioning of the re-formatted storage media to one or more logical local partitions to match a partitioning scheme of the hard drive of the computer system; and
   program instructions for enabling a formatting of each of the logical local partitions to match a formatting scheme of the hard drive of the computer system.

20. A computer readable media as recited in claim 18, wherein the program instructions for selecting of the backup set of data further comprises:
   program instructions for examining the hard drive of the computer system to identify programs and files that are stored on the hard drive, the programs and files are in addition to the default set of boot files and operating system files;
   program instructions for generating a user interface displaying the default set of boot files, operating system files, and the identified programs and files that are stored on the hard drive; and
   program instructions for selecting all of the identified programs and files if the storage media is sufficiently larger than a size of the default set of boot files, operating system files, and the identified programs and files that are stored on the hard drive of the computer system, otherwise only selecting certain ones of the identified programs and files that are stored on the hard drive.

21. A computer readable media as recited in claim 20, wherein the program instructions for selecting of the backup set of data further comprises:
   program instructions for generating a database file of the backup set of data, the database file being a pointer list identifying a location of each of the default set of boot files, operating system files, and selected programs and files stored on the hard drive of the computer system.

22. A computer readable media as recited in claim 18, further comprising:
   program instructions for scheduling when to incrementally copy portions of the backup set of data.

23. A computer readable media as recited in claim 18, further comprising:
   program instructions for collecting an e-mail address of a computer support personnel, and
   program instructions for sending an automatic e-mail message to the computer support personnel at the e-mail address after the failure occurs with the hard drive that disables booting to the hard drive.

24. A computer readable media as recited in claim 18, further comprising:
   program instructions for taking a footprint image of data stored on the hard drive of the computer system, the footprint image containing a list of operating system data, a list of peripheral device data, a list of controller card data, and a time stamp of when the footprint image was created.

25. A system for protecting data stored in a primary hard disk drive of a computer system, comprising:
   preparing a storage media of a secondary peripheral storage device to be a protection enabled media;
   selecting a backup set of data stored in the primary hard disk drive of the computer system, the backup set of data includes a default set of boot files and operating system files;
   creating a spare tire backup by performing a file-based copy operation of the backup set of data from the primary hard disk drive of the computer system to the storage media of the secondary peripheral storage device;
   enabling the secondary peripheral storage device to incrementally copy portions of the backup set of data from the primary hard disk drive of the computer system during normal use;
   booting the computer system from the secondary peripheral storage device when a failure occurs with the primary hard disk drive which is detected by a system BIOS of the computer system; and
   taking a footprint image of data stored on the primary hard disk drive of the computer system, the footprint image containing a list of operating system data, a list of peripheral device data, a list of controller card data, and a time stamp of when the footprint image was created, the footprint image being written to a file in text format each time a successful boot to the primary hard disk drive of the computer system occurs.

26. A system for protecting data stored in a primary hard disk drive of a computer system as recited in claim 25, wherein the preparing the storage media of the secondary peripheral storage device to be a protection enabled media further comprises:
   re-formatting the storage media of the secondary peripheral storage device;
   partitioning the re-formatted storage media to one or more logical local partitions to match a partitioning scheme of the primary hard disk drive of the computer system; and formatting each of the logical local partitions to match a formatting scheme of the primary hard disk drive of the computer system.

27. A system for protecting data stored in a primary hard disk drive of a computer system as recited in claim 25, wherein the preparing the storage media of the secondary peripheral storage device to be a protection enabled media further comprises:

writing one or more identification codes onto a first track of the storage media following a master boot record sector;

obtaining a serial number of the storage media; and writing the one or more identification codes along with the obtained serial number into a registry file of the computer system.

28. A system for protecting data stored in a primary hard disk drive of a computer system as recited in claim 25, wherein the selecting of the backup set of data further comprises:

examining the primary hard disk drive of the computer system to identify programs and files that are stored on the primary hard disk drive, the programs and files are in addition to the default set of boot files and operating system files;

generating a user interface displaying the default set of boot files, operating system files, and the identified programs and files that are stored on the primary hard disk drive; and selecting all of the identified programs and files if the storage media is sufficiently larger than a size of the default set of boot files, operating system files, and the identified programs and files that are stored on the primary hard disk drive of the computer system, otherwise only selecting certain ones of the identified programs and files that are stored on the primary hard disk drive.

29. A system for protecting data stored in a primary hard disk drive of a computer system as recited in claim 28, wherein the selecting of the backup set of data further comprises:

generating a database file of the backup set of data, the database file being a pointer list identifying a location of each of the default set of boot files, operating system files, and selected programs and files stored on the primary hard disk drive of the computer system.

30. A system for protecting data stored in a primary hard disk drive of a computer system as recited in claim 25, further comprising:

scheduling when to incrementally copy portions of the backup set of data.

31. A system for protecting data stored in a primary hard disk drive of a computer system as recited in claim 25, further comprising:

collecting an e-mail address of a computer support personnel, and sending an automatic e-mail message to the computer support personnel at the e-mail address after the failure occurs with the primary hard disk drive that disables booting to the primary hard disk drive.

32. A system for protecting a user's productivity upon detecting a failure with a storage media of the user's computer system, the system comprising;

a peripheral storage device having a storage media that is formatted to be a protection enabled media and contains a backup set of data including a default set of boot files and operating system files, the backup set of data being substantially continuously backed up on a schedule;

a host adapter basic input/output operating system (BIOS) being configured to receive an indication from a system BIOS that the failure has occurred with the storage media of the user's computer system, the host adapter BIOS being further configured to provide an option of re-booting the user's computer system from the peripheral storage device;

a computer user interface for providing options of repairing the storage media, restoring the storage media, or continue working from the peripheral storage device until the storage media is repaired and restored; and a preparation engine that is configured to write one or more identification codes onto a first track of the storage media of the peripheral storage device following a master boot record sector, obtain a serial number from the storage media of the peripheral storage device, and write the one or more identification codes along with the obtained serial number into a registry file of the user's computer system.

33. A system for protecting a user's productivity upon detecting a failure with a storage media of the user's computer system as recited in claim 32, further comprising:

a help notification system that is configured to automatically send an e-mail message to selected computer support, the e-mail message contains information that approximates a problem that caused the failure of the storage media.

34. A system for protecting a user's productivity upon detecting a failure with a storage media of the user's computer system as recited in claim 32, wherein the host adapter BIOS is integrated on a small computer system interface (SCSI) host adapter controller that couples the computer system to the peripheral storage device.

35. A system for protecting a user's productivity upon detecting a failure with a storage media of the user's computer system as recited in claim 32, wherein the preparation engine is configured to re-format the storage media of the peripheral storage device and partitioning the re-formatted storage media to one or more logical local partitions to match a partitioning scheme of the storage media of the user's computer system; and wherein the formatting of each of the logical local partitions is configured to match a formatting scheme of the media of the user's computer system.

* * * * *